US012696329B2

(12) United States Patent
Wang et al.

(10) Patent No.: US 12,696,329 B2
(45) Date of Patent: Jul. 28, 2026

(54) COMMUNICATION METHOD, APPARATUS, AND SYSTEM

(71) Applicant: HUAWEI TECHNOLOGIES CO., LTD., Shenzhen (CN)

(72) Inventors: Yong Wang, Shenzhen (CN); Mingchao Li, Beijing (CN); Qingchun He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/620,750

(22) Filed: Mar. 28, 2024

(65) Prior Publication Data

US 2024/0244681 A1     Jul. 18, 2024

Related U.S. Application Data

(63) Continuation of application No. PCT/CN2021/122352, filed on Sep. 30, 2021.

(51) Int. Cl.
| | |
|---|---|
| *H04W 76/10* | (2018.01) |
| *H04W 12/0431* | (2021.01) |
| *H04W 12/06* | (2021.01) |
| *H04W 12/69* | (2021.01) |

(52) U.S. Cl.
CPC ....... *H04W 76/10* (2018.02); *H04W 12/0431* (2021.01); *H04W 12/06* (2013.01); *H04W 12/69* (2021.01)

(58) Field of Classification Search
CPC . H04W 76/10; H04W 12/0431; H04W 12/69; H04W 12/06

USPC ......................................................... 370/329
See application file for complete search history.

(56) References Cited

U.S. PATENT DOCUMENTS

| | | | | |
|---|---|---|---|---|
| 10,560,977 | B2 * | 2/2020 | Motto ...................... | H04L 63/08 |
| 11,818,569 | B2 * | 11/2023 | Wifvesson .......... | H04W 12/062 |
| 11,902,779 | B1 * | 2/2024 | Wan ...................... | H04W 12/06 |

(Continued)

FOREIGN PATENT DOCUMENTS

| | | | | | |
|---|---|---|---|---|---|
| CN | 112491533 | A | * | 3/2021 | ............... H04L 9/08 |
| CN | 112740733 | A | | 4/2021 | |

(Continued)

OTHER PUBLICATIONS

5G; Procedures for the 5G System (5GS) (3GPP TS 23.502 version 16.7.0 Release 16), ETSI TS 123 502 V16.7.0 (Jan. 2021), total 607 pages.

(Continued)

*Primary Examiner* — Anthony Mejia
(74) *Attorney, Agent, or Firm* — WOMBLE BOND DICKINSON (US) LLP

(57) ABSTRACT

A method includes: obtaining, by a first node/second node, first information; and establishing a first communication connection to the second node based on the first information, where the first communication connection is used to transmit data of a first service, and the first communication connection is corresponding to a first communication technology; and the first node is a node that accesses a network corresponding to a second communication technology, and the first service is a service of the first communication technology or a service of the second communication technology.

20 Claims, 6 Drawing Sheets

First communication system

Second communication system

(56)     References Cited

U.S. PATENT DOCUMENTS

| | | | |
|---|---|---|---|
| 2014/0181904 A1* | 6/2014 | Craig | H04W 12/0431 |
| | | | 726/3 |
| 2018/0220364 A1 | 8/2018 | Li et al. | |
| 2020/0059783 A1* | 2/2020 | Wifvesson | H04W 12/06 |
| 2020/0314841 A1 | 10/2020 | Thubert et al. | |
| 2024/0015684 A1* | 1/2024 | Wiacek | H04W 12/122 |

FOREIGN PATENT DOCUMENTS

| | | | | |
|---|---|---|---|---|
| EP | 3562185 B1 * | 5/2024 | | H04W 12/06 |
| JP | 2016506161 A | 2/2016 | | |
| JP | 2016096452 A | 5/2016 | | |
| WO | 2020072652 A1 | 4/2020 | | |
| WO | 2020095938 A1 | 5/2020 | | |

OTHER PUBLICATIONS

ETSI TS 133 501 V16.3.0 (Aug. 2020), "5G; Security architecture and procedures for 5G System (3GPP TS 33.501 version 16.3.0 Release 16)," total 251 pages.

* cited by examiner

COMMUNICATION METHOD, APPARATUS, AND SYSTEM

CROSS-REFERENCE TO RELATED APPLICATIONS

This application is a continuation of International Application No. PCT/CN2021/122352, filed on Sep. 30, 2021, the disclosure of which is hereby incorporated by reference in its entirety.

TECHNICAL FIELD

Embodiments of this application relate to the field of communication technologies, and in particular, to a communication method, apparatus, and system.

BACKGROUND

With the rapid development of informatization, a mobile terminal (for example, a mobile phone, a tablet computer, or another portable intelligent terminal) has become an indispensable and important intelligent tool for individuals. In the mobile Internet era, compared with conventional computers (such as a desktop workstation and a server), these mobile terminals are more convenient to use but are more likely to threaten and damage personal information. Therefore, security of a communication technology is crucial.

With the rapid development of emerging industries such as intelligent vehicles, intelligent terminals, intelligent homes, and intelligent manufacturing, innovation requirements and applications are constantly emerging. In some scenarios, a design of converged communication based on different communication technologies is proposed. However, how to ensure a security requirement of a heterogeneous communication technology in a converged communication scenario is still an important problem that needs to be urgently resolved.

SUMMARY

Embodiments of this application provide a communication method, apparatus, and system, to help meet a security requirement of a heterogeneous communication technology in a converged communication scenario.

According to a first aspect, an embodiment of this application provides a communication method. The method may be applied to a first node, and the first node may support a first communication technology and a second communication technology. The method may include: obtaining first information; and establishing a first communication connection to a second node based on the first information, where the first communication connection is used to transmit data of a first service, and the first communication connection is corresponding to the first communication technology; and the first node is a node that accesses a network corresponding to the second communication technology. For example, the first service may be a service of the first communication technology or a service of the second communication technology.

In an embodiment, the first node may establish the first communication connection between the first node and the second node based on the first information associated with the first service. In this way, during service data transmission between the first node and the second node, the data corresponding to the first service may be transmitted by using the communication connection corresponding to the first service. Different communication connections may be corresponding to different service data transmission, to meet a security requirement in a converged communication scenario and ensure security of corresponding service data. For example, the first communication technology may be a short-range communication technology, and the second communication technology may be a fifth generation mobile communication technology (5G).

It should be noted that in this embodiment of this application, only a convergence scenario based on the first communication technology and the first communication technology is used as an example for description. This embodiment of this application may also be applied to another converged communication scenario. The first service may also include a service corresponding to another communication technology. This is not limited in embodiments of this application.

In an embodiment, the first information may include a first key used for communication authentication with the second node, and the obtaining first information may include: obtaining the first key based on a type corresponding to the second communication technology and/or a service type of the first service.

In an embodiment, the first node may trigger a process of establishing a connection between the first node and the second node, and the first node may obtain the first key based on a current communication scenario and/or a service requirement to establish the corresponding first communication connection between the first node and the second node based on the obtained first key, to transmit the data corresponding to the first service. For example, the type corresponding to the second communication technology may be a type of a communication standard used in the second communication technology, for example, a 5G technology.

In an embodiment, the first information may include a first key used for communication authentication with the second node, and the method further includes: receiving a first message from the second node, where the first message carries key type indication information or service type indication information; and the obtaining first information includes: obtaining the first key based on the key type indication information or the service type indication information.

In an embodiment, the second node may trigger a process of establishing a connection between the first node and the second node; and the first node may obtain, based on the key type indication information or the service type indication information from the second node, the first key associated with the first service, to establish, based on the obtained first key, the corresponding first communication connection between the first node and the second node to transmit the data corresponding to the first service.

In an embodiment, the establishing a first communication connection to a second node based on the first information includes: sending a second message associated with the first key to the second node, where the second message is used for identity authentication of the first node; receiving a third message that is in response to the second message, where the third message is used for identity authentication of the second node; and sending a fourth message to the second node when identity authentication of the second node succeeds, where the fourth message is used to establish the first communication connection to the second node.

It should be noted that in this embodiment of this application, the third message may be corresponding to one message. For example, the message may be used for identity authentication of the second node, and implicitly indicates that identity authentication of the first node succeeds. Alternatively, for another example, the message may be used to explicitly indicate that identity authentication of the first node succeeds, and may also be used for identity authentication of the second node. Alternatively, the third message may be corresponding to at least two messages, for example, a message indicating that identity authentication of the first node succeeds and a message used for identity authentication of the second node. A specific implementation of the third message is not limited in embodiments of this application. Similarly, the fourth message may also be corresponding to one message. For example, the message is used to establish the first communication connection to the second node, and implicitly indicates that identity authentication of the second node succeeds. Alternatively, for another example, the message may be used to establish the first communication connection to the second node, and may also be used to explicitly indicate that identity authentication of the second node succeeds. Alternatively, the fourth message may be corresponding to at least two messages, for example, a message used to establish the first communication connection to the second node and a message used to indicate that identity authentication of the second node succeeds. A specific implementation of the fourth message is not limited in embodiments of this application.

In an embodiment, the first node may perform mutual identity authentication (or identity authentication) with the second node based on the obtained first key; and after mutual authentication succeeds, the secure first communication connection is established between the two parties.

In an embodiment, the first key is a key used for a service of the first communication technology, or a key used for a service of the second communication technology.

In an embodiment, when the first service is a service of the first communication technology, the first key is a key used for a service of the first communication technology; and/or when the first service is a service of the second communication technology, the first key is a key used for a service of the second communication technology.

In an embodiment, the first node may obtain at least one key, and the first node may select a key from the at least one key based on the first service to establish the first communication connection corresponding to the first service, to ensure security of the service data of the first service.

In an embodiment, the key used for a service of the second communication technology includes a trusted key or an untrusted key, where the trusted key is a key that is successfully authenticated through the network, the untrusted key is a key that is not authenticated through the network, and a priority of the trusted key is higher than that of the untrusted key.

In an embodiment, the at least one key obtained by the first node may have a corresponding priority and/or use principle, so that the first node may select, from the at least one key based on the first service and the priority and/or the use principle, a key closely related to the first service as the first key.

It should be noted that in this embodiment of this application, a key is corresponding to a service. When the first service is a service of the first communication technology, a key used for a service of the second communication technology is not used; and when the first service is a service of the second communication technology, a key used for a service of the first communication technology is not used, and when there is a trusted key, an untrusted key is not used.

In an embodiment, before the establishing the first communication connection, the method further includes: receiving a key that is from the network and that is used for a service of the second communication technology.

In an embodiment, in a converged communication scenario based on the first communication technology and the second communication technology, the network corresponding to the second communication technology may be used to deliver, to the first node, a key used for a service of the second communication technology; and the first node receives the key to establish, in the converged communication scenario, the first communication connection between the first node and the second node based on the key. It should be understood that in this embodiment of this application, the key used for a service of the second communication technology may be a default value or a dynamically changing value. This is not limited in embodiments of this application. In addition, if the key is a key that is successfully authenticated through the network, the key is a trusted key; or if the key is a key that is not authenticated through the network, the key is a untrusted key.

In an embodiment, the first information includes a first security context used for communication with the second node, and the obtaining first information includes: receiving a fifth message from the second node, where the fifth message carries an identifier associated with the first security context; and the obtaining first information includes: obtaining the first security context based on the identifier.

In an embodiment, there may be a plurality of sets of security contexts in the second node. For example, the second node may select the first security context from the plurality of sets of security contexts based on the type corresponding to the second communication technology and/or the service type of the first service, and send the fifth message to the first node to indicate the identifier of the first security context. The first node may obtain, based on the identifier that is associated with the first security context and that is indicated by the second node, the first security context corresponding to the first service, to establish the secure first communication connection between the two parties based on the obtained first security context. For example, the type corresponding to the second communication technology may be a type of a communication standard used in the second communication technology, for example, a 5G technology.

In an embodiment, the first security context is a security context used for a service of the first communication technology, or a security context used for a service of the second communication technology.

In an embodiment, when the first service is a service of the first communication technology, the first security context is a security context used for a service of the first communication technology; and/or when the first service is a service of the second communication technology, the first security context is a security context used for a service of the second communication technology.

In an embodiment, the security context used for a service of the second communication technology includes a trusted security context or an untrusted security context, where the trusted security context is a security context that is successfully authenticated through the network, the untrusted security context is a security context that is not authenticated through the network, and a priority of the trusted security context is higher than that of the untrusted security context.

In an embodiment, there may be at least one set of security contexts between the first node and the second node, and the at least one set of security contexts may have corresponding priorities and/or a use principle, so that the first node may select, from the at least one set of security contexts based on the first service and the priorities and/or the use principle, a security context closely related to the first service as the first security context.

It should be noted that in this embodiment of this application, similar to a key, a security context is also corresponding to a service. When the first service is a service of the first communication technology, a security context used for a service of the second communication technology is not used; and when the first service is a service of the second communication technology, a security context used for a service of the first communication technology is not used, and when there is a trusted security context, an untrusted security context is not used.

In an embodiment, before the obtaining first information, the method further includes: sending a sixth message to the second node, where the sixth message carries information used to indicate that the first node supports the second communication technology. It should be noted that in this embodiment of this application, that the first node supports the second communication technology may also be understood as that the first node supports transmission of a service of the second communication technology, the first node supports service transmission corresponding to the second communication technology, or the first node supports service transmission implemented based on the second communication technology.

In an embodiment, the first node may add related indication information to the sixth message to notify the second node of a service type supported by the first node, so that the second node performs decision making based on a service performed between the second node and the first node, to establish the secure first communication connection and transmit the data of the first service between the two parties.

According to a second aspect, an embodiment of this application provides a communication method. The method is applied to a second node. The second node may support a first communication technology, or the second node may support a first communication technology and a second communication technology. The method may include: obtaining first information; and establishing a first communication connection to a first node based on the first information, where the first communication connection is used to transmit data of a first service, and the first communication connection is corresponding to the first communication technology; and the first node is a node that accesses a network corresponding to the second communication technology. For example, the first service may be a service of the first communication technology or a service of the second communication technology.

In an embodiment, the first information includes a first key used for communication authentication with the first node, and the obtaining first information includes: obtaining the first key based on a type corresponding to the second communication technology and/or a service type of the first service. For example, the type corresponding to the second communication technology may be a type of a communication standard used in the second communication technology, for example, a 5G technology. In an embodiment, the method further includes: sending a first message to the first node, where the first message carries information associated with the first key. For example, the information associated with the first key may include key type indication information or service type indication information. In an embodiment, the information associated with the first key may alternatively be the first key.

In an embodiment, the establishing the first communication connection to a first node based on the first information includes: receiving a second message from the first node, where the second message is associated with the first key, and the second message is used for identity authentication of the first node; when identity authentication of the first node succeeds, sending a third message to the first node, where the third message is used for identity authentication of the second node; and receiving a fourth message that is in response to the third message, where the fourth message is used to establish the first communication connection to the second node.

It should be noted that in this embodiment of this application, the third message may be corresponding to one message. For example, the message may be used for identity authentication of the second node, and implicitly indicates that identity authentication of the first node succeeds. Alternatively, for another example, the message may be used to explicitly indicate that identity authentication of the first node succeeds, and may also be used for identity authentication of the second node. Alternatively, the third message may be corresponding to at least two messages, for example, a message indicating that identity authentication of the first node succeeds and a message used for identity authentication of the second node. A specific implementation of the third message is not limited in embodiments of this application. Similarly, the fourth message may also be corresponding to one message. For example, the message is used to establish the first communication connection to the second node, and implicitly indicates that identity authentication of the second node succeeds. Alternatively, for another example, the message may be used to establish the first communication connection to the second node, and may also be used to explicitly indicate that identity authentication of the second node succeeds. Alternatively, the fourth message may be corresponding to at least two messages, for example, a message used to establish the first communication connection to the second node and a message used to indicate that identity authentication of the second node succeeds. A specific implementation of the fourth message is not limited in embodiments of this application.

In an embodiment, the first key is a key used for a service of the first communication technology, or a key used for a service of the second communication technology.

In an embodiment, when the first service is a service of the first communication technology, the first key is a key used for a service of the first communication technology; and/or when the first service is a service of the second communication technology, the first key is a key used for a service of the second communication technology.

In an embodiment, the key used for a service of the second communication technology includes a trusted key or an untrusted key, where the trusted key is a key that is successfully authenticated through the network, the untrusted key is a key that is not authenticated through the network, and a priority of the trusted key is higher than that of the untrusted key.

In an embodiment, before the establishing the first communication connection, the method further includes: receiving a key that is from the network and that is used for a service of the second communication technology.

In an embodiment, the first information includes a first security context, the first security context is used by the second node to establish the first communication connection to the first node, and the obtaining first information includes: obtaining the first security context based on a type corresponding to the second communication technology and/or a service type of the first service. For example, the type corresponding to the second communication technology may be a type of a communication standard used in the second communication technology, for example, a 5G technology.

In an embodiment, the first security context is a security context used for a service of the first communication technology, or a security context used for a service of the second communication technology.

In an embodiment, when the first service is a service of the first communication technology, the first security context is a security context used for a service of the first communication technology; and/or when the first service is a service of the second communication technology, the first security context is a security context used for a service of the second communication technology.

In an embodiment, the security context used for a service of the second communication technology includes a trusted security context or an untrusted security context, where the trusted security context is a security context that is successfully authenticated through the network, the untrusted security context is a security context that is not authenticated through the network, and a priority of the trusted security context is higher than that of the untrusted security context. With reference to the second aspect, in a possible implementation, the method further includes: sending a fifth message to the first node, where the fifth message carries an identifier associated with the first security context.

In an embodiment, the method further includes: receiving a sixth message from the first node, where the sixth message carries information used to indicate that the first node supports the second communication technology. It should be noted that in this embodiment of this application, that the first node supports the second communication technology may also be understood as that the first node supports transmission of a service of the second communication technology, the first node supports service transmission corresponding to the second communication technology, or the first node supports service transmission implemented based on the second communication technology.

According to a third aspect, an embodiment of this application provides a communication apparatus. The communication apparatus is applied to a first node, and includes: a communication unit, configured to communicate with a second node; and a processing unit, configured to: obtain first information; and establish a first communication connection to the second node based on the first information, where the first communication connection is used to transmit data of a first service, and the first communication connection is corresponding to a first communication technology; and the first node is a node that accesses a network corresponding to a second communication technology. For example, the first service is a service of the first communication technology or a service of the second communication technology.

In an embodiment, the first information includes a first key used for communication authentication with the second node; and the processing unit is configured to obtain the first key based on a type corresponding to the second communication technology and/or a service type of the first service. For example, the type corresponding to the second communication technology may be a type of a communication standard used in the second communication technology, for example, a 5G technology. With reference to the third aspect, in a possible implementation, the first information includes a first key used for communication authentication with the second node; the communication unit is configured to receive a first message from the second node, where the first message carries key type indication information or service type indication information; and the processing unit is configured to obtain the first key based on the key type indication information or the service type indication information.

In an embodiment, the communication unit is configured to: send a second message associated with the first key to the second node, where the second message is used for identity authentication of the first node; receive a third message that is in response to the second message, where the third message is used for identity authentication of the second node; and send a fourth message to the second node when identity authentication of the second node succeeds, where the fourth message is used to establish the first communication connection to the second node.

In an embodiment, the first key is a key used for a service of the first communication technology, or a key used for a service of the second communication technology.

In an embodiment, when the first service is a service of the first communication technology, the first key is a key used for a service of the first communication technology; and/or when the first service is a service of the second communication technology, the first key is a key used for a service of the second communication technology.

In an embodiment, the key used for a service of the second communication technology includes a trusted key or an untrusted key, where the trusted key is a key that is successfully authenticated through the network, the untrusted key is a key that is not authenticated through the network, and a priority of the trusted key is higher than that of the untrusted key.

In an embodiment, before the processing unit establishes the first communication connection, the communication unit is further configured to receive a key that is from the network and that is used for a service of the second communication technology.

In an embodiment, the first information includes a first security context used for communication with the second node; the communication unit is configured to receive a fifth message from the second node, where the fifth message carries an identifier associated with the first security context; and the processing unit is configured to obtain the first security context based on the identifier.

In an embodiment, the first security context is a security context used for a service of the first communication technology, or a security context used for a service of the second communication technology.

In an embodiment, when the first service is a service of the first communication technology, the first security context is a security context used for a service of the first communication technology; and/or when the first service is a service of the second communication technology, the first security context is a security context used for a service of the second communication technology.

In an embodiment, the security context used for a service of the second communication technology includes a trusted security context or an untrusted security context, where the trusted security context is a security context that is successfully authenticated through the network, the untrusted security context is a security context that is not authenticated through the network, and a priority of the trusted security context is higher than that of the untrusted security context. With reference to the third aspect, in a possible implementation, the communication unit is further configured to send a sixth message to the second node before the processing unit obtains the first information, where the sixth message carries information used to indicate that the first node supports the second communication technology.

According to a fourth aspect, an embodiment of this application provides a communication apparatus, including: a communication unit, configured to communicate with a first node; and a processing unit, configured to: obtain first information; and establish a first communication connection to the first node based on the first information, where the first communication connection is used to transmit data of a first service, and the first communication connection is corresponding to a first communication technology, and the first node is a node that accesses a network corresponding to a second communication technology. For example, the first service may be a service of the first communication technology or a service of the second communication technology.

In an embodiment, the first information includes a first key used for communication authentication with the first node; and the processing unit is configured to obtain the first key based on a type corresponding to the second communication technology and/or a service type of the first service. For example, the type corresponding to the second communication technology may be a type of a communication standard used in the second communication technology, for example, a 5G technology. In an embodiment, the communication unit is further configured to send a first message to the first node, where the first message carries information associated with the first key. For example, the information associated with the first key may include key type indication information or service type indication information.

In an embodiment, the communication unit is configured to: receive a second message from the first node, where the second message is associated with the first key, and the second message is used for identity authentication of the first node; when identity authentication of the first node succeeds, send a third message to the second node, where the third message is used for identity authentication of the second node; and receive a fourth message that is in response to the third message, where the fourth message is used to establish the first communication connection to the second node.

In an embodiment, the first key is a key used for a service of the first communication technology, or a key used for a service of the second communication technology.

In an embodiment, when the first service is a service of the first communication technology, the first key is a key used for a service of the first communication technology; and/or when the first service is a service of the second communication technology, the first key is a key used for a service of the second communication technology.

In an embodiment, the key used for a service of the second communication technology includes a trusted key or an untrusted key, where the trusted key is a key that is successfully authenticated through the network, the untrusted key is a key that is not authenticated through the network, and a priority of the trusted key is higher than that of the untrusted key.

In an embodiment, before the processing unit establishes the first communication connection, the communication unit is configured to receive a key that is from the network and that is used for a service of the second communication technology.

In an embodiment, the first information includes a first security context, the first security context is used by the second node to establish the first communication connection to the first node; and the processing unit is configured to obtain the first security context based on a type corresponding to the second communication technology and/or a service type of the first service. For example, the type corresponding to the second communication technology may be a type of a communication standard used in the second communication technology, for example, a 5G technology.

In an embodiment, the first security context is a security context used for a service of the first communication technology, or a security context used for a service of the second communication technology.

In an embodiment, when the first service is a service of the first communication technology, the first security context is a security context used for a service of the first communication technology; and/or when the first service is a service of the second communication technology, the first security context is a security context used for a service of the second communication technology.

In an embodiment, the security context used for a service of the second communication technology includes a trusted security context or an untrusted security context, where the trusted security context is a security context that is successfully authenticated through the network, the untrusted security context is a security context that is not authenticated through the network, and a priority of the trusted security context is higher than that of the untrusted security context.

In an embodiment, the communication unit is further configured to send a fifth message to the first node, where the fifth message carries an identifier associated with the first security context.

In an embodiment, the communication unit is further configured to receive a sixth message from the first node, where the sixth message carries information used to indicate that the first node supports the second communication technology.

According to a fifth aspect, an embodiment of this application provides a communication apparatus, including a processor and a memory. The memory is configured to store a program. The processor is configured to execute the program stored in the memory, so that the apparatus implements the method according to any one of the first aspect and the possible embodiments of the first aspect, or implements the method according to any one of the second aspect and the possible embodiments of the second aspect.

According to a sixth aspect, an embodiment of this application provides a communication apparatus, including at least one processor and an interface circuit. The interface circuit is configured to provide data or code instructions for the at least one processor. The at least one processor is configured to implement, by using a logic circuit or executing the code instructions, the method according to any one of the first aspect and the possible embodiments of the first aspect or the method according to any one of the second aspect and the possible embodiments of the second aspect.

According to a seventh aspect, an embodiment of this application provides a communication system, including the communication apparatus according to any one of the third aspect and the possible embodiments of the third aspect and the communication apparatus according to any one of the fourth aspect and the possible embodiments of the fourth aspect.

According to an eighth aspect, an embodiment of this application provides a computer-readable storage medium. The computer-readable storage medium stores program code. When the program code is run on a computer, the computer is enabled to perform the method according to any one of the first aspect and the possible embodiments of the first aspect; or when the program code is run on a computer, the computer is enabled to perform the method according to any one of the second aspect and the possible embodiments of the second aspect.

According to a ninth aspect, an embodiment of this application provides a computer program product. When the computer program product runs on a computer, the computer is enabled to perform the method according to any one of the first aspect and the possible embodiments of the first aspect, or perform the method according to any one of the second aspect and the possible embodiments of the second aspect.

According to a tenth aspect, an embodiment of this application provides a chip system. The chip system includes a processor, configured to invoke a computer program or computer instructions stored in a memory, so that the processor performs the method according to any one of the first aspect and the possible embodiments of the first aspect, or performs the method according to any one of the second aspect and the possible embodiments of the second aspect.

In an embodiment, the processor is coupled to the memory by using an interface.

In an embodiment, the chip system further includes a memory, and the memory stores a computer program or computer instructions.

According to an eleventh aspect, an embodiment of this application provides a processor. The processor is configured to invoke a computer program or computer instructions stored in a memory, so that the processor performs the method according to any one of the first aspect and the possible embodiments of the first aspect, or performs the method according to any one of the second aspect and the possible embodiments of the second aspect.

According to a twelfth aspect, an embodiment of this application provides a terminal device. The terminal device may be configured to implement the method according to any one of the first aspect and the possible embodiments of the first aspect, or implement the method according to any one of the second aspect and the possible embodiments of the second aspect. For example, the terminal device includes but is not limited to an intelligent transportation device (such as a vehicle, a ship, an unmanned aerial vehicle, a train, or a truck), an intelligent manufacturing device (such as a robot, an industrial device, intelligent logistics, or a smart factory), and an intelligent terminal (such as a mobile phone, a computer, a tablet computer, a palmtop computer, a desktop computer, a headset, a sound device, a wearable device, or a vehicle-mounted device).

According to a thirteenth aspect, an embodiment of this application provides a vehicle. The vehicle may be configured to implement the method according to any one of the first aspect and the possible embodiments of the first aspect, and/or implement the method according to any one of the second aspect and the possible embodiments of the second aspect.

According to a fourteenth aspect, an embodiment of this application provides a vehicle. The vehicle may include the communication apparatus according to any one of the third aspect and the possible embodiments of the third aspect, and/or the communication apparatus according to any one of the fourth aspect and the possible embodiments of the fourth aspect.

Based on the embodiments provided in the foregoing aspects, embodiments of this application may be further combined to provide more embodiments.

For a technical effect that can be achieved in any possible embodiment of any one of the second aspect to the fourteenth aspect, correspondingly refer to a description of a technical effect that can be achieved in any possible embodiment of the first aspect. Repeated content is not described.

DESCRIPTION OF EMBODIMENTS

Embodiments of this application provide a communication method, apparatus, and system, to help meet a security requirement of a heterogeneous communication technology in a converged communication scenario. The method and the apparatus are based on a same technical idea. Because a problem-resolving principle of the method is similar to a problem-resolving principle of the apparatus, mutual reference may be made to implementation of the apparatus and the method. Repeated parts are not described in detail. For ease of understanding, the following provides a description with reference to accompanying drawings and embodiments.

Figure 1:
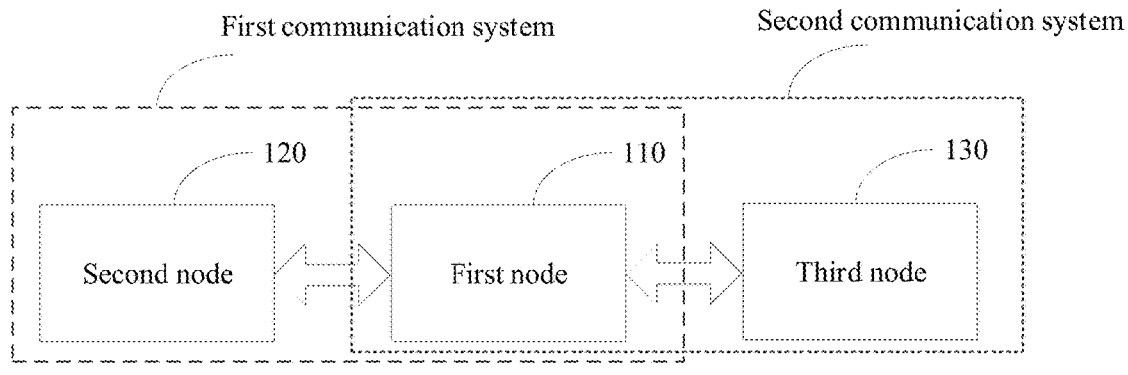
FIG. 1 is a schematic diagram of a system architecture to which an embodiment of this application is applicable.

FIG. 1 is a schematic diagram of a system architecture to which an embodiment of this application is applicable.

As shown in FIG. 1, the system architecture may include a first node 110, a second node 120, and a third node 130. The first node 110 and the second node 120 may form a first communication system, and the two parties may communicate with each other by using a first communication technology. The first node 110 and the third node 130 may form a second communication system. The two parties may communicate with each other by using a second communication technology. The first communication technology is different from the second communication technology. In a converged communication scenario based on the first communication technology and the second communication technology, a communication connection may be established between the first communication system and the second communication system to form a heterogeneous communication system, so that a corresponding communication service is performed and/or communication service data is transmitted in the heterogeneous communication system. For example, the heterogeneous communication system may also be referred to as a converged communication system, a tight interworking communication system, or an interworking communication system.

In this embodiment of this application, any one of the first node 110, the second node 120, or the third node 130 may be an electronic device having a data receiving and sending capability.

For example, the electronic device may be a terminal device, including a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. For example, the terminal device may communicate with a core network through a radio access network (RAN), and exchange a voice and/or data with the RAN.

In a specific implementation process, the terminal device may include but is not limited to a vehicle, user equipment (UE), a wireless terminal device, a mobile terminal device, a device-to-device (D2D) terminal device, a vehicle to everything (V2X) terminal device, a machine-to-machine/ machine-type communication (M2M/MTC) terminal device, an Internet of Things (IoT) terminal device or a narrow band Internet of Things (NB-IoT) terminal device, a subscriber unit, a subscriber station, a mobile station, a mobile console, a remote station, an access point (AP), a remote terminal device, an access terminal device, a user terminal device, a user agent, or a user device. For another example, the terminal device may be implemented as a mobile phone (or referred to as a "cellular" phone) or a computer having a mobile terminal device; a dedicated terminal device in the IoT, an industrial control device, a remote medical device, a smart grid device, or a smart city device; a portable, pocket-sized, handheld, computer built-in, or vehicle-mounted mobile apparatus; or a personal communication service (PCS) phone, a cordless phone, a session initiation protocol (SIP) phone, a wireless local loop (WLL) station, or a personal digital assistant (PDA). In an embodiment, the terminal device may be alternatively implemented as a restricted device, for example, a device with relatively low power consumption, a device with a limited storage capability, or a device with a limited computing capability. In an embodiment, the terminal device may include components such as a barcode, a radio frequency identification (RFID), a sensor, a global positioning system (GPS), and a laser scanner.

In an embodiment, the terminal device may alternatively be a wearable device. The wearable device may also be referred to as a wearable smart device, a smart wearable device, or the like, and is a general term of wearable devices, for example, glasses, gloves, watches, clothes, and shoes, developed by performing intelligent design of daily wear by using a wearable technology. The wearable device is a portable device that is worn directly on a body or integrated into clothing or accessories of a user. The wearable device not only is a type of hardware device, but also can implement a powerful function through software support, data exchange, and cloud interaction. Generalized wearable smart devices include devices that have full functions and large sizes and that implement complete or partial functions without relying on a smartphone, for example, a smartwatch or smart glasses; and include devices that are focused only on a type of application function and that need to be used in cooperation with another device such as a smartphone, for example, various smart bands, smart helmets, and smart jewelry for physical sign monitoring.

In an embodiment, the terminal device may alternatively be a machine intelligent device, for example, a self-driving device, a transportation safety device, a virtual reality (VR) terminal device, or an augmented reality (AR) terminal device.

If the various terminal devices described above are located in a vehicle (for example, placed in the vehicle or installed in the vehicle), all the terminal devices may be considered as vehicle-mounted terminal devices. A vehicle-mounted terminal device may be, for example, also referred to as an on-board unit (OBU).

In an embodiment, the terminal device may further include a relay. Alternatively, it is understood that the terminal device may include any device that can perform data communication with a base station.

For example, the electronic device may alternatively be a network device. For example, the network device includes an access network (AN) device. The access network device may include a device such as a base station or an access point that communicates with a wireless terminal device over an air interface in an access network by using one or more cells. The base station may be configured to perform conversion between a received over-the-air frame and an Internet Protocol (IP) packet, and serve as a router between the terminal device and a rest part in the access network. The rest part in the access network may include an IP network. In an embodiment, the network device may include a base station in a second generation (2G) communication system, include a base station in a third generation (3G) communication system, or include a base station in a fourth generation (4G) communication system, for example, an evolved NodeB (eNB, or e-NodeB, evolutional NodeB) in a long term evolution (LTE) system or a long term evolution-advanced (LTE-A) system. Alternatively, the network device may include a next generation NodeB (gNB) in a 5th generation (5G) new radio (NR) system (also referred to as an NR system for short), or may include a central unit (CU) and a distributed unit (DU) in a cloud access network (Cloud RAN) system, and a base station in various future communication systems, for example, a base station in a sixth generation (6G) communication system. This is not limited in embodiments of this application. For another example, the network device may include a network device in V2X, that is, a roadside unit (RSU). The RSU may include a fixed infrastructure entity supporting a V2X application, and may exchange a message with another entity supporting the V2X application. For another example, the network device may alternatively include a core network device. The core network device includes, for example, one or more of the following items in a 5G system: an access and mobility management function (AMF), a session management function (SMF), and a user plane function (UPF), or includes a mobility management entity (MME) or the like in a 4G system.

It should be understood that, in some technical scenarios, electronic devices with similar data receiving and sending capabilities may not be referred to as nodes. However, for ease of description, electronic devices with data receiving and sending capabilities are collectively referred to as nodes in embodiments of this application.

Figure 2:
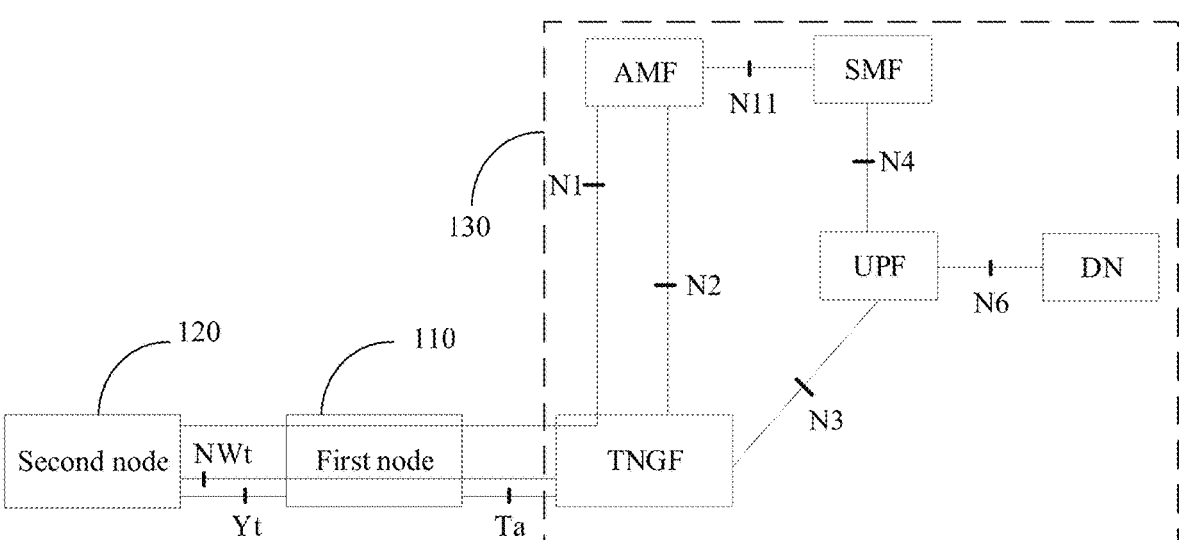
FIG. 2 is a schematic diagram of a system architecture to which an embodiment of this application is applicable.

In an embodiment of this application, in the heterogeneous communication system shown in FIG. 1, device types of the first node 110, the second node 120, and the third node 130 may be the same or different. For example, the first node 110, the second node 120, and the third node 130 are all terminal devices or network devices; or the first node 110 and the second node 120 may be terminal devices, and the third node 130 may be a network device. For example, the first communication technology is a short-range communication technology, and the second communication technology is a 5G communication technology. As shown in FIG. 2, the first node 110 and the second node 120 may be terminal devices with a short-range communication function, and the third node 130 may include but is not limited to at least one of functional entities such as an access device: a trusted non-3rd Generation Partnership Project (Non-3GPP) gateway function (Trusted Non-3GPP Gateway Function, TNGF) and core network devices: an SMF, an AMF, a UPF, and a data network (DN). The first node 110 may support the first communication technology and the second communication technology, and may be used as a master node (or referred to as an authorized node) of the second node 120. The first node 110 performs short-range communication with the second node 120. In addition, the first node 110 performs 5G communication with the third node 130. It should be noted that, that the first node 110 may support the first communication technology may also be understood as that the first node may support service transmission implemented based on the first communication technology or that the first node may support a service of the first communication technology; and that the second node 120 supports the second communication technology may be understood as that the second node may support service transmission implemented based on the second communication technology or that the second node may support a service of the second communication technology.

Nodes or function entities may be connected to each other through an interface. An interface sequence number or an interface name is not limited in embodiments of this application. An interface defined based on a 3GPP-related standard protocol of a 5G system may be used, or an interface in a future communication system may be used. For example, the second node 120 may communicate with the first node 110 through a Yt interface, the first node 110 may communicate with a TNGF through a Ta interface, and the second node 120 may communicate with the TNGF through an NWt interface. The second node 120 and the first node 110 may communicate with an AMF through a next generation network (next generation, N)1 interface (referred to as N1 for short), a network device (for example, a TNGF) communicates with the AMF through an N2 interface (referred to as N2 for short), the TNGF communicates with a local UPF through an N3 interface (referred to as N3 for short), and the UPF communicates with a DN through an N6 interface (referred to as N6 for short). The AMF communicates with an SMF through an N11 interface (referred to as N11 for short), and the SMF communicates with the UPF through an N4 interface (referred to as N4 for short). In this way, a 5G network can perceive key information such as a device status, a network status, and a service status of the second node 120 by using the first node 110, to remotely access, perceive, and manage a field network and service in an industry, and the like.

It should be noted that, the foregoing merely provides an example to indicate that the heterogeneous communication system may include the first node 110, the second node 120, and the third node 130 and indicate a communication mode between each node and a function module of the heterogeneous communication system, and does not limit quantities of the nodes and an interface sequence number or an interface name. In specific implementation, a quantity of first nodes 110, a quantity of second nodes 120, and a quantity of third nodes 130 each may not be limited to 1.

In addition, it should be noted that in this embodiment of this application, in an optional design, the first node 110 may perform a process of establishing a radio resource control (RRC) connection to the third node 130. After the first node 110 establishes the RRC connection to the third node 130, an RRC status of the first node 110 is an RRC connected state.

Subsequently, the RRC status of the first node 110 may be switched between the following states: an RRC idle (RRC_IDLE) state, an RRC connected (RRC_CONNECTED) state, and an RRC inactive (RRC_INACTIVE) state. In the converged communication scenario in this embodiment of this application, the first node 110 may be in any one of the foregoing idle state, connected state, and inactive state. This is not limited in embodiments of this application. In addition, in this embodiment of this application, that a communication connection is established between any two nodes means that signal transmission and exchange may be performed between the two nodes to implement communication between the two nodes. The communication connection includes but is not limited to a physical connection or a virtual connection. The connections are not distinguished below one by one.

In embodiments of this application, the short-range communication technology may include a technology that supports wireless short-range communication. Wireless short-range communication refers to that two communication parties transmit information by using a radio wave and a transmission distance falls within a relatively short range (for example, within 100 meters), including but not limited to a Bluetooth technology, a wireless fidelity (Wi-Fi) technology, a near field communication (NFC) technology, a Wi-Fi Aware technology, a universal short-range communication technology, and a short-range communication technology in the Star Alliance specification. Short-range communication may be widely applied in various aspects such as file transfer, remote control, projection, and perception of a surrounding device (such as an intelligent vehicle, an intelligent terminal device, an intelligent home device, and an intelligent manufacturing device). The following describes examples of several short-range communication technologies.

Bluetooth: Bluetooth is a radio technology that supports short-range communication between devices, and can be used to exchange wireless information between a plurality of devices such as a mobile phone, a wireless headset, a notebook computer, and a related peripheral. By using the "Bluetooth" technology, communication between mobile communication terminal devices can be effectively simplified, and communication between a device and the Internet can also be successfully simplified, so that data transmission becomes faster and more efficient, and an application range of wireless communication is widened.

Wi-Fi technology: It is also referred to as wireless local area network (WLAN) direct connection or Wi-Fi Direct. The Wi-Fi technology is one of Wi-Fi protocol clusters, and enables devices to easily connect to each other without using an intermediate wireless access point. Usage of the Wi-Fi technology ranges from web browsing to file transfer. The Wi-Fi technology allows a plurality of devices to communicate with each other at the same time, and can give full play to a speed advantage of Wi-Fi. Devices that meet this standard can be easily connected to each other even if they are from different manufacturers.

Wi-Fi Aware technology: In the Wi-Fi technology, the Wi-Fi Aware technology is responsible for perception and discovery, and can help a Wi-Fi device perceive a surrounding service, for example, a surrounding device, to implement peer to peer (P2P) message exchange between two devices at a short distance through Wi-Fi Aware. Because Wi-Fi Aware can be used to perceive a surrounding device, a plurality of functions may be implemented, for example, perceiving a nearby person and establishing a connection to add a friend, play a same game, or the like; or discovering a surrounding device to implement photo sharing, location sharing, or the like; or securely sending a file to a printer without accessing a network (for example, a cellular or wireless network).

It should be noted that, in addition to the foregoing listed short-range communication technologies, other existing short-range communication technologies, or other short-range communication technologies that may emerge in the future with evolution of communication technologies may also be applicable to this solution.

In addition, it should be noted that the functional entities or network elements in FIG. 2 may alternatively interact with each other through a service-oriented interface. For example, a service-oriented interface provided by the AMF for the outside may be a network access and mobility management function (Namf) interface, and a service-oriented interface provided by the SMF for the outside may be a network session management function (Nsmf) interface. For related descriptions, refer to a 5G system architecture defined in the 3GPP-23501 standard. Details are not described herein.

Each function included in the system architecture may also be referred to as a functional entity or a network element or may have another name. For example, the SMF may be referred to as an SMF entity. In an optional design, each function in this embodiment of this application may be implemented by one device, or may be implemented by a plurality of devices together, or may be implemented by one or more function modules in a device. This is not specifically limited in embodiments of this application. It may be understood that, each function in this embodiment of this application may be a function of a network element in a hardware device, or may be a function of software running on dedicated hardware, a function implemented by a combination of hardware and software, or a virtualization function instantiated on a platform (for example, a cloud platform).

It should be noted that a distribution form of the functions is not limited in embodiments of this application. In an optional design, the functions included in the foregoing system architecture may also be corresponding to another functional entity formed after combination of a plurality of any of the foregoing functions or combination between the plurality of any of the foregoing functions and another function, for example, a functional entity with two functions: session management and policy control, a functional entity with three functions: session management, access and mobility management, and policy control, or a functional entity with two functions: network opening and an application function.

It should be noted that the system architectures shown in FIG. 1 and FIG. 2 do not constitute a limitation on a system architecture to which embodiments of this application are applicable. A quantity of terminal devices in FIG. 2 is merely an example. During actual application, the network device may serve a plurality of terminal devices. The network device and all or some of the plurality of terminal devices each may use the communication method provided in embodiments of this application. Each function or device in embodiments of this application may also be referred to as a communication apparatus. The function or device may be a general-purpose device or a dedicated device. This is not limited in embodiments of this application.

It should be noted that, in embodiments of this application, "at least one" means one or more, and "a plurality of" means two or more. "And/or" describes an association relationship between associated objects and represents that three relationships may exist. For example, A and/or B may represent the following cases: Only A exists, both A and B exist, and only B exists, where A and B each may be in a singular or plural form. A character "/" generally indicates that the associated objects are in an "or" relationship. "At least one (item) of the following" or a similar expression thereof means any combination of these items, including a singular (item) or any combination of a plurality of (items). For example, at least one (item) of a, b, or c may represent: a, b, c, a and b, a and c, b and c, or a, b, and c, where a, b, and c each may be in a singular or plural form.

In addition, unless otherwise specified, ordinal numbers such as "first", "second", and "third" mentioned in embodiments of this application are used to distinguish between a plurality of objects, but are not used to limit priorities or importance of the plurality of objects. For example, the first node, the second node, and the third node are merely used to distinguish between different nodes, instead of indicating different priorities, importance, or the like of the three nodes.

In addition, it should be noted that, in embodiments of this application, a service of the first communication technology may be understood as a service implemented by using the first communication technology (for example, a service implemented by using a non-5G technology, and further, a service implemented by using a short-range communication technology), or a service corresponding to the first communication technology (for example, a non-5G service, and further, a short-range communication service). A service of the second communication technology may include a service of the second communication technology in a converged communication scenario. The service of the second communication technology may be understood as a service implemented by using the second communication technology (for example, a service implemented through 5G) or a service corresponding to the second communication technology (for example, a 5G service). In embodiments of this application, that the first communication connection is corresponding to the first communication technology may be understood as that the first communication connection is a connection implemented based on the first communication technology. For example, when the first communication technology is a short-range communication technology, the first communication connection is a connection implemented by using the short-range communication technology. Further, optionally, the communication connection may be used to transmit a service of the first communication technology, or may be used to transmit a service of the second communication technology. This is not described below one by one. In embodiments of this application, a network corresponding to the second communication technology may be understood as a network that supports at least the second communication technology, or a network that supports at least service transmission implemented based on the second communication technology, for example, a 5G network or a 5G core network.

Based on the system architectures shown in FIG. 1 and FIG. 2, in the converged communication scenario in this embodiment of this application, in an embodiment, for a first communication system including the first node 110 and the second node 120, to ensure communication security of the first communication system, after selecting the trusted first node 110 and when initially establishing a link to the first node 110, the second node 120 may perform mutual identity authentication with the first node 110 by using a preset key; and after identity authentication succeeds, a communication connection between the two parties is established based on a security context corresponding to the key. Further, to ensure communication security of the heterogeneous communication system including the first node 110, the second node 120, and the third node 130, the second node 120 may further initiate new identity authentication and/or a new security context negotiation procedure to the third node 130 by using the first node 110, to determine a new key and a corresponding security context between the three nodes through negotiation.

When there are at least two sets of keys and/or corresponding security contexts in the first node 110 and the second node 120, the first node 110 and the second node 120 may further select a required key or security context from the at least two sets of keys and/or corresponding security contexts, to establish a secure communication connection to a peer node based on the selected key or security context. This ensures a security requirement for performing a corresponding communication service and/or transmitting communication service data between the two parties.

It should be noted that in an embodiment of this application, a key is a parameter, and may be a parameter input in an algorithm for converting a plaintext into a ciphertext or an algorithm for converting a ciphertext into a plaintext. Any two parties of the first node 110, the second node 120, and the third node 130 may initiate an identity authentication procedure and/or a security context negotiation procedure based on a key. After identity authentication between the two parties succeeds, the two parties can obtain a security context agreed on through negotiation, that is, an access control attribute. Based on the security context, the two parties may initiate a connection establishment procedure to establish a secure communication connection between the two parties. It should be understood that, if a security context agreed on through negotiation has already existed between any two parties of the first node 110, the second node 120, and the third node 130, the two parties do not need to perform the identity authentication procedure and/or the security context negotiation procedure, and may directly use the security context agreed on through negotiation, to initiate a connection establishment procedure to establish a secure communication connection between the two parties.

It should be understood that in an embodiment of this application, the first node 110, the second node 120, and the third node 130 may all support one or more key agreement algorithms. Before initiating the identity authentication procedure and/or the security context negotiation procedure, any two parties of the first node 110, the second node 120, and the third node 130 may further complete key agreement between the two parties through information exchange. For example, the key agreement algorithm may include but is not limited to: an asymmetric encryption algorithm such as a public key encryption (RSA) algorithm or an elliptic curve encryption (ECC) algorithm; a dedicated key exchange algorithm such as a Diffie-Hellman key agreement (DH) algorithm or an elliptic curve Diffie-Hellman key exchange (ECDH) algorithm; and a shared key algorithm such as a pre-shared key (PSK) algorithm. This is not limited in embodiments of this application. For ease of description, the following describes a specific implementation process of the communication method in embodiments of this application by using a PSK algorithm as an example. Details are not described herein.

Identity authentication is also referred to as "identity verification" or "identity authentication", and refers to completing identity confirmation of a node by using a specific means. There are many implementations of identity authentication methods, for example, an identity authentication method based on a PSK, an identity authentication method based on a biological feature, and an identity authentication method based on a public key encryption algorithm. Identity authentication based on a pre-shared key means that one key or a group of keys may be shared between at least two nodes, for example, between the first node 110 and the second node 120, between the first node 110 and the third node 130, or between the first node 110, the second node 120, and the third node 130. When identity authentication needs to be performed, the first node 110, the second node 120, or the third node 130 may send the PSK (or a related parameter associated with the PSK, and a specific implementation of the related parameter is not limited in embodiments of this application) to a peer node. After receiving the PSK, the peer node checks whether the PSK is consistent with a locally stored key. If the PSK is consistent with the locally stored key, it may be determined that identity authentication succeeds; or if the PSK is inconsistent with the locally stored key, it may be determined that identity authentication fails. A security context agreed on through negotiation can be obtained only when any two nodes successfully perform mutual identity authentication, and a secure communication connection is established between the two parties based on the security context, to ensure a security requirement for performing a corresponding communication service and/or transmitting communication service data between the two parties.

In an embodiment, the first node 110 and the second node 120 may select first information (for example, including a first key and/or a first security context) associated with a first service, and perform information exchange based on the first information to establish a first communication connection between the first node 110 and the second node 120. The first communication connection may be used to transmit data of the first service, to meet a security requirement in a converged communication scenario and also allow the third node 130 to perceive related information of the second node 120 by using the first node 110, to remotely access, perceive, and manage a network and a service that are corresponding to the second node 120; and the like. During implementation, in different scenarios, a procedure of the communication method may be triggered by the first node 110 or the second node 120. This is not limited in embodiments of this application.

For ease of understanding, the following describes the communication method with reference to the accompanying drawings and embodiments. It should be noted that operations included in method embodiments described in this application are merely examples of optional operations in the communication method, and do not limit a specific implementation process of the communication method. In some optional implementations, implementation sequence numbers of operations in any method embodiment may be alternatively exchanged.

Figure 3:
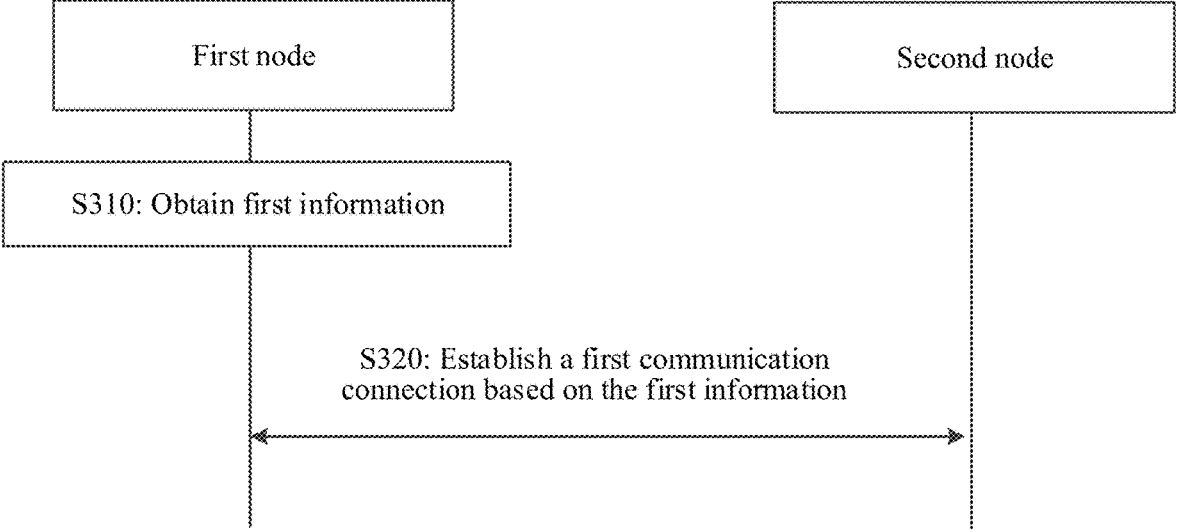
FIG. 3 is a schematic flowchart of a communication method according to an embodiment of this application.

As shown in FIG. 3, in an example, the method procedure may be triggered by the first node 110, and may include the following operations.

S310: The first node 110 obtains first information.

S320: The first node 110 establishes a first communication connection to the second node 120 based on the first information, where the first communication connection is used to transmit data of a first service, and the first communication connection is corresponding to a first communication technology; and the first node 110 is a node that accesses a network corresponding to a second communication technology.

It may be understood that the first information is associated with the first service. For example, the first service may be a service of the first communication technology or a service of the second communication technology.

It should be understood that in this embodiment of this application, the first node and the second node are described to distinguish between different nodes. In some examples, the first node may be the second node, and the second node may be the first node. The method procedure shown in FIG. 3 may be triggered by the second node 120. To be specific, the second node 120 may obtain first information, and establish a first communication connection to the first node 110 based on the first information. This is not limited in embodiments of this application.

The first information may include related information required for establishing a secure communication connection between the first node 110 and the second node 120. The first information may be pre-stored in the first node 110 or the second node 120, or may be obtained by the first node 110 or the second node 120 from a network side or another device side. This is not limited in embodiments of this application.

In an embodiment of this application, the first node 110 and the second node 120 may be in a scenario in which there is no security context, and the first information may include a first key used for communication authentication between the first node 110 and the second node 120. During implementation of S320, the first node 110 may perform identity authentication and a security context negotiation procedure with the second node 120 based on the first key. Further, the first communication connection may be established between the first node 110 and the second node 120 based on a first security context obtained through negotiation. Alternatively, the first node 110 and the second node 120 may be in a scenario in which there is a security context, and the first information may include a first security context used for communication between the first node 110 and the second node 120. During implementation of S320, the first communication connection may be established between the first node 110 and the second node 120 based on the first security context.

In an embodiment, when the first information is a key used for communication authentication between the first node 110 and the second node 120, the key may include a preset key corresponding to the first node 110 or the second node 120, or the key may be from the network corresponding to the second communication technology (for example, a core network corresponding to the third node 130). For example, the key is a key used for a service of the second communication technology.

In this embodiment of this application, specific implementation processes of S310 and S320 are different in different cases. For ease of understanding, the following provides descriptions with reference to a method flowchart.

Case 1: The first information includes the first key used for communication authentication between the first node 110 and the second node 120.

In this case, the first node 110 and the second node 120 have no first security context associated with the first service. During establishment of the first communication connection between the first node 110 and the second node 120, the first key may be first obtained, and then mutual identity authentication and negotiation of the first security context may be performed based on the obtained first key. When identity authentication between the two parties succeeds and the first security context is obtained, the first node 110 may initiate, to the second node 120 based on the obtained first security context, a message used to establish a communication connection, to establish the first communication connection between the first node 110 and the second node 120 based on the first security context.

Method Example 1

Figure 4A:
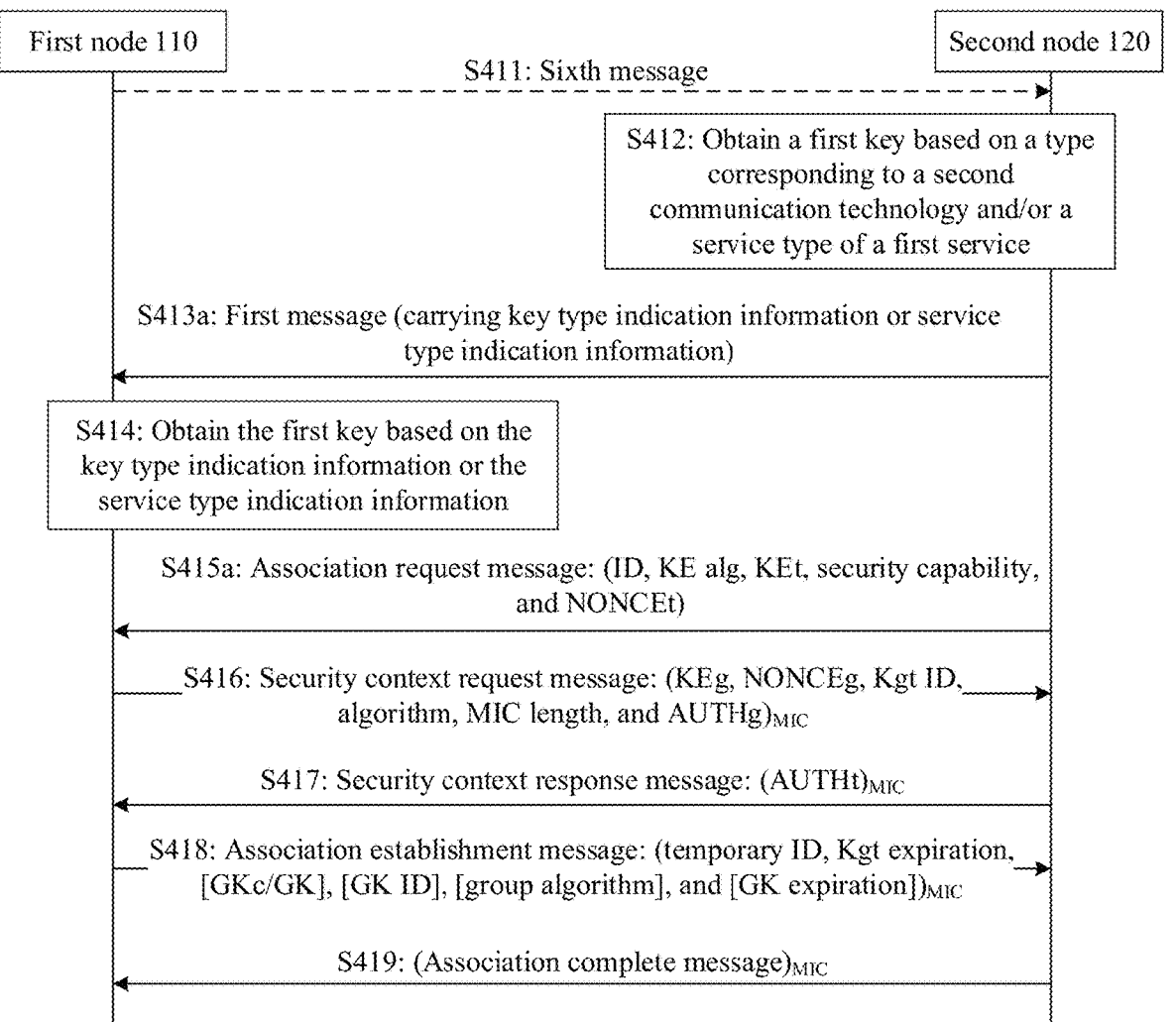
FIG. 4a is a schematic flowchart of a communication method according to an embodiment of this application.

In Method example 1, the second node 120 may obtain the first key. After obtaining the first key, the second node 120 may report key type indication information or service type indication information to the first node 110. The first node 110 determines the first key based on the key type indication information or the service type indication information reported by the second node 120, and performs identity authentication and a security context negotiation procedure with the second node 120, to establish a secure first communication connection between the first node 110 and the second node 120. It should be noted that operations S411 to S419 included in Method example 1 are merely examples of optional operations. In some examples, implementation sequence numbers of the following operations may be alternatively exchanged. This is not specifically limited in embodiments of this application. As shown in FIG. 4a, the communication method may include, for example, the following operations.

S411 (optional): The first node 110 sends a sixth message (for example, a system message). Correspondingly, the second node 120 may receive the sixth message.

For example, the sixth message may carry (or bear) first indication information, and the first indication information may be used to indicate a service type (including a service corresponding to the second communication technology) supported by the first node 110.

In an embodiment, the first indication information may further indicate one or more key agreement algorithms supported by the first node 110, so that the second node 120 may select, based on the first indication information and from key agreement algorithms supported by the second node 120, a key agreement algorithm also supported by the first node 110, to complete key agreement between the two parties to generate, based on the key agreement algorithm (for example, the foregoing PSK algorithm) determined through negotiation, a related authentication parameter used for node identity authentication. It should be understood that key agreement between the first node 110 and the second node 120 may not be limited to being implemented by using the sixth message. This is not limited in embodiments of this application. For ease of understanding and description, the PSK algorithm is used as an example for description in this specification.

Further, the sixth message may further carry an identity (for example, a domain identifier (ID)) of the first node 110, and the identity may be used to uniquely identify the first node 110.

For example, the sixth message may be a unicast message. In S411, the first node 110 may send the sixth message to the second node 120. Alternatively, the sixth message may be a broadcast message. In S411, the first node 110 may broadcast the sixth message, and the second node 120 may be in a coverage area of a broadcast signal, and may receive the sixth message.

After receiving the sixth message, the second node 120 may learn, by parsing the sixth message, the service type supported by the first node 110.

S412: The second node 120 (for example, a service layer of the second node 120) obtains the first key or a type of the first key based on a type corresponding to the second communication technology and/or a service type of the first service.

For example, the type corresponding to the second communication technology may be a type of a communication standard used in the second communication technology, for example, a 5G technology.

It should be understood that, during implementation of S412, the second node 120 may alternatively obtain the first key or the type of the first key based on related indication information input by a user, or obtain the first key or the type of the first key based on related indication information from another device. This is not limited in embodiments of this application.

It should be understood that in this embodiment of this application, the second node 120 may obtain the first key or the type of the first key in another manner. This is not limited in embodiments of this application.

In an embodiment of this application, in a converged communication scenario based on the first communication technology and the second communication technology, the first key may be implemented in any one of the following manners:

Example 1: The First Key is a Key Used for a Service of the First Communication Technology The first key may be a key (for example, the corresponding preset key described above) configured between the first node 110 and the second node 120. The key is corresponding to a service of the first communication technology, and may be used to establish the first communication connection after identity authentication and security context negotiation are completed between the first node 110 and the second node 120, and perform, based on the established first communication connection, the service of the first communication technology or secure transmission of service data that is based on the first communication technology. Correspondingly, a security context corresponding to the key is a security context of the service of the first communication technology. In an embodiment of this application, for ease of differentiation, the key used for the service of the first communication technology may also be referred to as a common key, and a security context corresponding to the common key may also be referred to as a common security context.

That the common key is a common PSK is used as an example. A method for configuring the common PSK may include any one of the following methods:

(1) Key configuration method: The common PSK is pre-configured in the first node 110 and the second node 120 by using a pre-configuration method. Detailed implementation of the pre-configuration method is not described herein.

(2) Password configuration method: A user inputs a same password to the first node 110 and the second node 120. The password may be converted into the common PSK. For example, the password may be converted into the common PSK by using an algorithm (for example, a key agreement algorithm) in the node. It should be understood that different second nodes 120 may be connected to a same first node 110 by using different passwords. Details are not described herein.

(3) Method for performing configuration by using an authentication credential from a third-party server: A main objective of the method for performing configuration by using an authentication credential from a third-party server is to identify whether the second node 120 and the first node 110 meet a preset binding relationship. The second node 120 should be capable of obtaining the identity of the first node 110, generating verification information by using an identity of the second node 120 and the identity of the first node 110, and sending the verification information to the third-party server to obtain an authentication password. After obtaining the authentication password sent by the third-party server, the first node 110 and the second node obtain the common PSK based on the authentication password.

According to any one of the foregoing configuration methods, a same common PSK may be configured between the second node 120 and the first node 110. It should be understood that in this embodiment of this application, the second node 120 and the first node 110 may alternatively complete, by using another method, a process of configuring, between the two nodes, the PSK used for a service of the first communication technology. Details are not described herein.

Example 2: The First Key is a Key Used for a Service of the Second Communication Technology For ease of differentiation, the key used for the second communication technology may be referred to as a fused key. In an embodiment, the fused key may include a trusted key or an untrusted key. The trusted key is a key that is successfully authenticated through the network (for example, the foregoing new key that is determined between the first node 110, the second node 120, and the third node 130 through new identity authentication and/or the security context negotiation procedure initiated by the second node 120 to the third node 130 in the converged communication scenario by using the first node 110). The untrusted key is a key that is not authenticated through the network (for example, the foregoing preset key used when the second node initially establishes a link to the first node, and the preset key may be used for mutual identity authentication between the first node and the second node). The network herein may be understood as a network corresponding to the third node. For example, the network may be a 5G core network. It should be understood that in this embodiment of this application, the key that is not authenticated through the network may be understood as a key that is not confirmed through the network or that does not need to be confirmed through the network (for example, a default key), or a key that has undergone confirmation through the network but is not successfully confirmed. Correspondingly, the first key may be a trusted key or an untrusted key. The first key is corresponding to a service of the second communication technology, and may be used to ensure, in a converged communication scenario, that the service of the second communication technology is securely implemented between the first node 110, the second node 120, and the third node 130, or service data implemented by using the second communication technology is securely transmitted. The first key may be, for example, a key (for example, the key is correspondingly the foregoing new key or is correspondingly a trusted key) obtained through negotiation between the third node 130 and at least one of the first node 110 and the second node 120. For example, the first key may be a key obtained through negotiation between the third node 130 and the first node 110. For another example, the first key may be a key obtained through negotiation between the third node 130 and the second node 120. For another example, the first key may be a key obtained through negotiation between the first node 110, the second node 120, and the third node 130. For another example, the first key may be an untrusted key.

For example, the fused key is a fused PSK. The fused PSK may be delivered by a core network corresponding to the third node 130 to the first node 110 and/or the second node 120, or the PSK may be a default key parameter configured in the first node 110 or the second node 120. Configuration implementation may be one of the three manners in Example 1 or another implementation. This is not limited in embodiments of this application. The first node or the second node may receive a fused key from the network corresponding to the second communication technology. For example, before the first communication connection is established between the first node and the second node, the first node or the second node may receive the fused key from the network, and locally store the fused key, so that in a subsequent process of establishing the first communication connection, the first node or the second node may determine, based on the type corresponding to the second communication technology and/or based on the service type of the first service, the first key used in the process of establishing the first communication connection. Before establishing the first communication connection, the first node receives the fused key from the network corresponding to the second communication technology, so that the first node further obtains the first key based on the received first information in the process of establishing the first communication connection.

If the PSK has not been authenticated through the core network (for example, a 5G core network) corresponding to the third node 130 or is not obtained through a key agreement process, or the PSK is obtained after a key agreement process but has not been agreed on, the fused PSK is an untrusted fused PSK. If the fused PSK is authenticated through the core network corresponding to the third node 130 and/or is obtained after a key agreement process and is agreed on, the fused PSK is a trusted fused PSK. Correspondingly, a security context corresponding to the trusted fused PSK is a trusted security context used for a service of the second communication technology in a converged communication scenario, and a security context corresponding to the untrusted fused PSK is an untrusted security context used for the service of the second communication technology in the converged communication scenario. It should be understood that in this embodiment of this application, the network corresponding to the second communication technology may be understood as a network that supports at least the second communication technology, or a network that supports at least service transmission implemented based on the second communication technology.

In S412, the second node 120 selects, based on the type corresponding to the second communication technology and/or the service type of the first service, and the like, a key from the at least two keys described in Example 1 or Example 2 as the first key.

It should be noted that in this embodiment of this application, when there are a plurality of keys, the plurality of keys may have priorities and a use principle. The first key is associated with the first service, and the first key needs to be selected from the plurality of keys according to at least the following principles: When the first service is a service of the first communication technology, the first key is a key used for a service of the first communication technology; and/or when the first service is a service corresponding to the second communication technology, the first key is a key used for a service of the second communication technology.

Using the common PSK, the trusted fused PSK, and the untrusted fused PSK as examples, a principle for using the plurality of keys may be as follows: (1) In a converged communication scenario, if there is the trusted fused PSK for a service of the second communication technology, the untrusted fused PSK is not used, but the trusted fused PSK is used, in other words, a priority of the trusted fused PSK is higher than that of the untrusted fused PSK. (2) In a converged communication scenario, when there is no trusted fused PSK for a service of the second communication technology, the untrusted fused PSK is used instead of the common PSK. (3) For a service of the first communication technology, even if there is the trusted fused PSK, the common PSK needs to be used to ensure security of a private service between the first node 110 and the second node 120.

Based on the foregoing key use principle, the second node 120 may obtain a corresponding first key or a corresponding type of the first key based on the service type of the first service. For example, if the first service is a service of the second communication technology in a converged communication scenario, the trusted fused PSK is used if there is the trusted fused PSK (further, if a connection fails to be established based on the trusted fused PSK, the untrusted fused PSK is used); and if there is no trusted fused PSK, the untrusted fused PSK is used. Usually, the untrusted fused PSK may be a default value. For example, when the first node 110 and the second node 120 are devices that support the second communication technology, the untrusted fused PSK may be configured in the first node 110 and the second node 120. For another example, if the first service is a service of the first communication technology, the first node 110 and the second node 120 may establish the first communication connection to each other by using the common PSK.

S413*a*: The second node 120 (for example, the service layer of the second node 120) sends a first message to the first node 110. Correspondingly, the first node 110 may receive the first message from the second node 120.

In an embodiment of this application, the first message may also be referred to as a key indication message, and the first message may carry information associated with the first key, for example, key type indication information, service type indication information, or other information.

In an embodiment of this application, the key type indication information may be used to indicate that a key type is any one of the following: an untrusted fused key (for example, the foregoing untrusted fused PSK), a trusted fused key (for example, the foregoing trusted fused PSK), or a common key (for example, the foregoing common PSK). The service type indication information may be used to indicate that a service type is any one of the following: a service of the first communication technology, or a service of the second communication technology in a converged communication scenario.

In some embodiments, the first message may further carry the identity (for example, a media access layer identifier) of the second node 120. For example, the first message may be represented as the following tuple:

(ID, key type indication information or service type indication information)

S414: The first node 110 obtains the first key based on the key type indication information or the service type indication information.

In an embodiment of this application, the first node 110 may store a plurality of keys. During implementation of S414, the first node 110 may obtain the first key from a plurality of local keys based on the key type indication information or the service type indication information. Alternatively, during implementation of S414, the first node 110 may obtain the first key from another device based on the key type indication information or the service type indication information. This is not limited in embodiments of this application. For example, the first key may be any one of the common PSK, the untrusted fused PSK, or the trusted fused PSK described above. For a configuration process of the common PSK, the untrusted fused PSK, or the trusted fused PSK, refer to related descriptions in S412. Details are not described again.

Therefore, the first node 110 and the second node 120 may agree on the selected first key through negotiation. Further, the first node 110 and the second node 120 may perform identity authentication and a security context negotiation procedure based on the obtained first key.

For example, as shown in FIG. 4a, identity authentication and the security context negotiation procedure may include the following operations.

S415a (optional): The second node 120 sends an association request message to the first node 110. Correspondingly, the first node 110 receives the association request message.

For example, the association request message may carry the identity (for example, a domain identifier) of the second node 120, and a related authentication parameter used for identity authentication of the second node 120, including but not limited to a key agreement algorithm (for example, represented by KE alg) selected by the second node 120, a key agreement parameter (for example, represented by KEt), a security capability (sec capabilities) of the second node 120, and a random number (for example, represented by NONCEt). The security capability may include one or more of a key derivation function (KDF), an encryption algorithm, an integrity protection algorithm, an authentication encryption algorithm, and the like that are supported by the second node 120. Details are not described herein.

The first node 110 may process the association request message based on related information carried in the association request message.

For example, for the second node 120 that performs connection in the key configuration manner, if a whitelist is configured in the first node 110, the first node 110 may determine, based on the identity of the second node 120, whether a fixed identity of the second node 120 is in the whitelist; and if the fixed identity of the second node 120 is not in the whitelist, discard the association request message.

For another example, the first node 110 may determine whether the key agreement algorithm selected by the second node 120 is in information (for example, the first indication information) carried in the foregoing sixth message; and if the key agreement algorithm is not in the information, the first node 110 discards the association request message; or if the key agreement algorithm is in the information, the first node 110 may select, based on the security capability of the second node 120, a policy of optimal algorithm selection pre-configured in the first node 110, and the service type, an algorithm with a highest priority, including a key derivation function, a signaling-plane authentication encryption algorithm, and a signaling-plane integrity protection algorithm with highest priorities; and a user-plane authentication encryption algorithm and a user-plane integrity protection algorithm with highest priorities, or a user-plane authentication encryption algorithm with a highest priority. The policy of optimal algorithm selection may be implemented by using a list of algorithms sorted based on priorities, for example, a key derivation function priority list, a signaling-plane authentication encryption algorithm priority list, a signaling-plane integrity protection algorithm priority list, a user-plane authentication encryption algorithm priority list, and a user-plane integrity protection algorithm priority list that are pre-configured in the first node 110. Algorithms selected for a signaling plane and a user plane may be different. In an embodiment, when a selected integrity algorithm or authentication encryption algorithm supports a plurality of message integrity code (MIC) lengths, the first node 110 may further select a MIC length for signaling-plane integrity protection based on a MIC length supported by a selected signaling-plane integrity protection algorithm. For example, this process may be implemented by using a corresponding operation in the Star Alliance specification, or may be implemented in another manner. This is not specifically limited in embodiments of this application.

In an embodiment, the first node 110 may further generate, based on related information carried in the first message and/or a related algorithm selected by the first node 110, a related authentication parameter used for identity authentication of the first node 110.

For example, the first node 110 may generate a private key, and generate a corresponding public key according to a selected key agreement algorithm (for example, for a specific key agreement algorithm, refer to related descriptions in S411). The public key may be used as a key agreement parameter (for example, represented by KEg) of the first node 110. Alternatively, the first node 110 may generate a random number (for example, represented by NONCEg). Alternatively, the first node 110 may obtain a shared key (for example, represented by $K_{KE}$) through calculation based on KEt carried in the first message and a key agreement algorithm. Alternatively, the first node 110 may obtain a shared key (for example, represented by Kgt) through calculation based on $K_{KE}$, NONCEt, and NONCEg by using a selected key derivation function. A calculation manner thereof is as follows:

$$Kgt=KDF(K_{KE},NONCEt,NONCEg)$$

Alternatively, the first node 110 may generate an identifier of Kgt (for example, represented by Kgt ID). Alternatively, the first node 110 may calculate an authentication parameter (for example, represented by AUTHg). A calculation manner thereof is as follows:

$$AUTHg=AUF(PSK,K_{KE},NONCEg,\text{assocation request}$$
$$\text{message})|_{higher-order\ 32\ bits}, \text{where}$$

$AUF(\ )|_{higher-order\ 32\ bits}$ indicates that calculation on parameters included in the bracket is performed by using a key derivation function AUF and then information of higher-order 32 bits is used as AUTHg. AUF and KDF in the foregoing use a same authentication encryption algorithm.

The first node 110 may generate a security context request message (an example of a second message) based on the obtained first key and one or more of the related authentication parameters described above.

For example, the security context request message may include a related authentication parameter used for identity authentication of the first node 110, including but not limited to a key agreement parameter KEg of the first node 110, a random number NONCEg, an identifier Kgt ID associated with the first security context corresponding to the first key, a selected algorithm, a MIC length, and an authentication parameter AUTHg. The selected algorithm may include one or more of a key derivation algorithm, a signaling-plane encryption algorithm, a signaling-plane integrity protection algorithm, a user-plane encryption algorithm, a user-plane integrity protection algorithm, and a user-plane authentication encryption algorithm.

In an embodiment, the first node 110 may further perform integrity protection on the security context request message by using a selected signaling-plane integrity protection algorithm and a selected signaling-plane integrity protection key Ks.int, that is, calculate a MIC; and add the MIC to the security context request message.

For example, the security context request message may be represented as the following tuple:

(KEg, NONCEg, Kgt ID, algorithm, MIC length, AUTHg)$_{MIC}$, where ( )$_{MIC}$ indicates that the security context request message is a message on which integrity protection processing has been performed.

S416: The first node 110 sends, to the second node, a security context request message (an example of the second message) associated with the first key. Correspondingly, the second node 120 receives the security context request message from the first node 110.

In an embodiment of this application, the second message may be used for identity authentication of the first node 110. It should be understood that in this embodiment of this application, that the second message may be used for identity authentication of the first node 110 may be understood as that information included or carried in the second message may be used for identity authentication of the first node 110.

In an embodiment of this application, the second message is associated with the first key. In an embodiment, information carried in the second message includes information generated based on the first key.

In an embodiment, the second node 120 may obtain, through calculation in a manner the same as that used by the first node 110, a shared key Kgt, a signaling-plane security key, a user-plane security key, and the like based on a key derivation function selected by the first node 110.

In an embodiment, the second node 120 may check integrity of the second message, that is, check whether a MIC is correct. If integrity verification fails, the second node 120 discards the message and may resend an association request message.

In an embodiment, the second node 120 may further verify, based on the first key agreed on through negotiation, whether AUTHg is correct. If AUTHg verification fails, the second node 120 discards the second message, and may resend an association request message. It should be understood that in this embodiment of this application, the checking integrity of the message may include checking integrity of information included or carried in the message.

Further, the second node 120 may further generate, based on related information carried in the security context request message and/or a related algorithm of the second node 120, a related authentication parameter used for identity authentication of the second node 120.

For example, the second node 120 may calculate the authentication parameter AUTHt, and a calculation method thereof meets the following expression:

AUTHt=AUF(PSK,$K_{KE}$,security context request message,NONCEt,key agreement algorithm capability of the first node 110,first indication information)$|_{higher\text{-}order\ 32\ bits}$, where AUF( )$|_{higher\text{-}order\ 32\ bits}$ indicates that calculation on parameters included in the bracket is performed by using a key derivation function AUF and then information of higher-order 32 bits is used as AUTHt. AUF and KDF in the foregoing use a same authentication encryption algorithm.

In an embodiment, after successfully performing identity authentication of the first node 110, the second node 120 may generate a security context response message (an example of a third message) based on the generated related authentication parameter.

S417: The second node 120 sends a security context response message (an example of the third message) to the first node 110. Correspondingly, the first node 110 receives the security context response message from the second node 120.

In an embodiment of this application, the third message may be used for identity authentication of the second node, and the third message may be sent when identity authentication of the first node 110 succeeds.

It should be understood that in this embodiment of this application, the third message may be used to indicate that identity authentication of the first node 110 succeeds and may be used for identity authentication of the second node 120; and the third message includes or carries information used to indicate that identity authentication of the first node succeeds and information used for identity authentication of the second node. In addition, in an embodiment, the information used to indicate that identity authentication of the first node 110 succeeds and the information used for identity authentication of the second node 120 may be sent by using a same message, or may be sent by using different messages. Correspondingly, the third message may be corresponding to one message, or may be corresponding to a plurality of messages. This is not limited in embodiments of this application. For example, the third message may include AUTHt.

For example, the second node 120 may perform integrity protection on the security context response message by using a signaling-plane integrity protection algorithm and a signaling-plane integrity protection key Ks.int.

It should be understood that in this embodiment of this application, that the second node 120 may perform integrity protection on the security context response message by using a signaling-plane integrity protection algorithm and a signaling-plane integrity protection key Ks.int may be understood as that the second node 120 may perform, by using the signaling-plane integrity protection algorithm and the signaling-plane integrity protection key Ks.int, integrity protection on information included or carried in the security context response message. A MIC generated by integrity protection may be carried in the security context response message. When signaling-plane encryption protection is started, the second node 120 may perform encryption protection on the security context response message by using a signaling-plane encryption algorithm and a signaling-plane encryption key Ks.enc.

For example, the security context response message may be represented as follows:

(AUTHt)$_{MIC}$, where

AUTHt is an example of a related authentication parameter carried in the security context response message, and ( )$_{MIC}$ indicates that the security context response message is a message on which integrity protection processing has been performed.

In addition, if the second node 120 encrypts the security context response message (or encrypts information included or carried in the security context response message), after receiving the security context response message, the first node 110 may decrypt the security context response message (or decrypt the information included or carried in the security context response message).

The first node 110 may check integrity of the security context response message (or check integrity of a message included or carried in the security context response message), and verify whether AUTHt carried in the security context response message is correct. If integrity or AUTHt verification fails, in other words, identity authentication of the second node 120 fails, the first node 110 may send an association establishment failure message to the second node 120. If integrity and AUTHt verification succeeds, the first node 110 may generate, for the second node 120, a temporary ID (for example, a physical layer identifier) used to identify an identity of the second node 120.

The first node 110 may perform identity authentication on the second node 120 based on related information carried in the security context response message. For example, this process may be implemented by using a corresponding operation in the Star Alliance specification, or may be implemented in another manner. This is not specifically limited in embodiments of this application.

S418: The first node 110 may send an association establishment message (an example of a fourth message) to the second node when identity authentication of the second node 120 succeeds. Correspondingly, the second node 120 receives the association establishment message from the first node 110.

In an embodiment of this application, the fourth message may be used to establish the first communication connection to the second node, and the fourth message may be sent when identity authentication of the second node 120 succeeds.

It should be understood that in this embodiment of this application, the fourth message may be used to indicate that identity authentication of the second node succeeds and may be used to request to establish the first communication connection to the second node; and the fourth message includes or carries information used to indicate that identity authentication of the second node succeeds and information used to request to establish the first communication connection to the second node. In addition, in an optional design, in this embodiment of this application, the information used to indicate that identity authentication of the second node succeeds and the information used to request to establish the first communication connection to the second node may be sent by using a same message, or may be sent by using different messages. Correspondingly, the fourth message may be corresponding to one message, or may be corresponding to a plurality of messages. This is not limited in embodiments of this application.

For example, the fourth message may include one or more of the following parameters generated by the first node 110 for the second node 120: a temporary ID (T-ID) (for example, a physical layer identifier), shared key Kgt expiration (Kgt expiration), [GKc/GK], [GK ID], [Galgorithm], and [GK expiration (GK expiration)].

[GKc/GK] indicates that a group key (for example, represented by GK) of a group to which the second node 120 belongs is carried in the fourth message when it is notified, in a unicast mode, that signaling-plane encryption protection is enabled and that GKc is carried in the fourth message when it is notified, in the unicast mode, that signaling-plane encryption protection is not enabled. GKc is obtained by performing exclusive OR processing on GK and a secret key (for example, represented by Kg) of the protection group key GK:

$$Kg=KDF(Kgt, Counterg, \text{"group key"}); \text{ and}$$

$$GKc=\oplus Kg, \text{ where}$$

[GK ID] is an identifier of GK, and Galgorithm is a group algorithm of the group to which the second node 120 belongs.

In an embodiment, the first node 110 may perform integrity protection on the association establishment message by using a signaling-plane integrity protection algorithm and a signaling-plane integrity protection key Ks.int.

It should be understood that in this embodiment of this application, that the first node 110 may perform integrity protection on the association establishment message by using a signaling-plane integrity protection algorithm and a signaling-plane integrity protection key Ks.int may be understood as that the first node 110 may perform, by using the signaling-plane integrity protection algorithm and the signaling-plane integrity protection key Ks.int, integrity protection on information included or carried in the association establishment message. A MIC generated by integrity protection may be carried in the association establishment message. When signaling-plane encryption protection is started, the first node 110 may perform encryption protection on the association establishment message by using a signaling-plane encryption algorithm and a signaling-plane encryption key Ks.enc.

It should be understood that in this embodiment of this application, that the first node 110 may perform encryption protection on the association establishment message by using a signaling-plane encryption algorithm and a signaling-plane encryption key Ks.enc may be understood as that the first node 110 may perform, by using the signaling-plane encryption algorithm and the signaling-plane encryption key Ks.enc, encryption protection on the information included or carried in the association establishment message.

For example, the association establishment message may be represented as the following tuple:

(Temporary ID, Kgt expiration, [GKc/GK], [GK ID], [Galgorithm], [GK expiration])$_{MIC}$, where ( )$_{MIC}$ indicates that the association establishment message is a message on which integrity protection processing has been performed.

In an embodiment, when receiving an association establishment failure message, the second node 120 may re-initiate an association request message.

In an embodiment, when the second node 120 receives the association establishment message, if the association establishment message is encrypted (or the information included or carried in the association establishment message is encrypted), the second node 120 may decrypt the association establishment message (or decrypt the information included or carried in the association establishment message). The second node 120 may further check integrity of the association establishment message (or check integrity of the information included or carried in the association establishment message).

If integrity verification fails, the second node 120 discards the message.

If integrity verification succeeds, the following S419 is performed: The second node 120 may send an association complete message to the first node 110. Correspondingly, the first node 110 may receive the association complete message from the second node 120. The association complete message may be used to indicate that establishment of the first communication connection is completed.

In an embodiment, the second node 120 may perform integrity protection on the association complete message by using a signaling-plane integrity protection algorithm and a signaling-plane integrity protection key Ks.int.

It should be understood that in this embodiment of this application, that the second node 120 may perform integrity protection on the association complete message by using a signaling-plane integrity protection algorithm and a signaling-plane integrity protection key Ks.int may be understood as that the second node 120 may perform, by using the signaling-plane integrity protection algorithm and the signaling-plane integrity protection key Ks.int, integrity protection on information included or carried in the association complete message. When signaling-plane encryption protection is started, the second node 120 may perform encryption protection on the association complete message by using a signaling-plane encryption algorithm and a signaling-plane encryption key Ks.enc. It should be understood that in this embodiment of this application, that the second node 120 may perform encryption protection on the association complete message by using a signaling-plane encryption algorithm and a signaling-plane encryption key Ks.enc may be understood as that the second node 120 may perform, by using the signaling-plane encryption algorithm and the signaling-plane encryption key Ks.enc, encryption protection on the information included or carried in the association complete message.

For example, the association complete message may be represented as follows:

(Association complete message)$_{MIC}$, where ( )$_{MIC}$ indicates that the association complete message is a message on which integrity protection processing has been performed.

The first node 110 may process the received association complete message.

For example, if the association complete message is encrypted (or the information included or carried in the association complete message is encrypted), the first node 110 may decrypt the association complete message (or decrypt the information included or carried in the association complete message). Alternatively, the first node 110 may check integrity of the association complete message (or check integrity of the information included or carried in the association complete message). If integrity verification fails, the message is discarded. If integrity verification succeeds, a subsequent procedure is performed. Details are not described herein.

After security context negotiation and association are completed, the first node 110 and the second node 120 may store a first security context obtained through negotiation.

For example, the first security context may include but is not limited to the identity ID, the temporary ID, Kgt, the Kgt expiration, Kgt ID, the key agreement algorithm, the signaling-plane encryption algorithm and the signaling-plane integrity protection algorithm, the signaling-plane encryption key and the signaling-plane integrity protection key, the user-plane encryption algorithm and the user-plane integrity protection algorithm or the user-plane authentication encryption algorithm, the user-plane encryption key and the user-plane integrity protection key or the user-plane authentication encryption key, [GK], [GK ID], [group algorithm], and [GK expiration].

In an embodiment, the first node 110 and the second node 120 may further support a mechanism of deleting a security context that has expired, and a clock may be configured for a node that needs to store a security context, to support the mechanism. Details are not described herein. Alternatively, the first node 110 may further store a correspondence between the identity of the second node 120 and the first key, and the second node 120 may further store a correspondence between the identity of the first node 110 and the first key.

After establishment of the first communication connection is completed, during performing of a service between the first node 110 and the second node 120, a service range corresponding to the first communication connection may be determined based on a key type or a service type, and the service corresponding to the service range is transmitted.

For example, a communication connection (including a security context) established based on a trusted fused PSK can be used only for a service of the second communication technology in a converged communication scenario. A communication connection (including a security context) established based on a common PSK is used for a service of the first communication technology (for example, may be a service other than a service of the second communication technology in a converged communication scenario).

Method Example 2

In Method example 2, the second node 120 may obtain a first key. After obtaining the first key, the second node 120 may synchronously obtain a related parameter used for identity authentication of the second node 120, and add, to one message (for example, an association request message), key type indication information or service type indication information and the related parameter used for identity authentication of the second node 120, so that the first node 110 may determine the first key based on the key type indication information or the service type indication information reported by the second node 120, and perform identity authentication and a security context negotiation procedure with the second node 120 based on the related parameter reported by the second node 120, to establish a secure first communication connection between the first node 110 and the second node 120. It should be noted that operations S411 to S419 included in Method example 2 are merely examples of optional operations. In some examples, implementation sequence numbers of the following operations may be alternatively exchanged. This is not specifically limited in embodiments of this application.

Figure 4B:
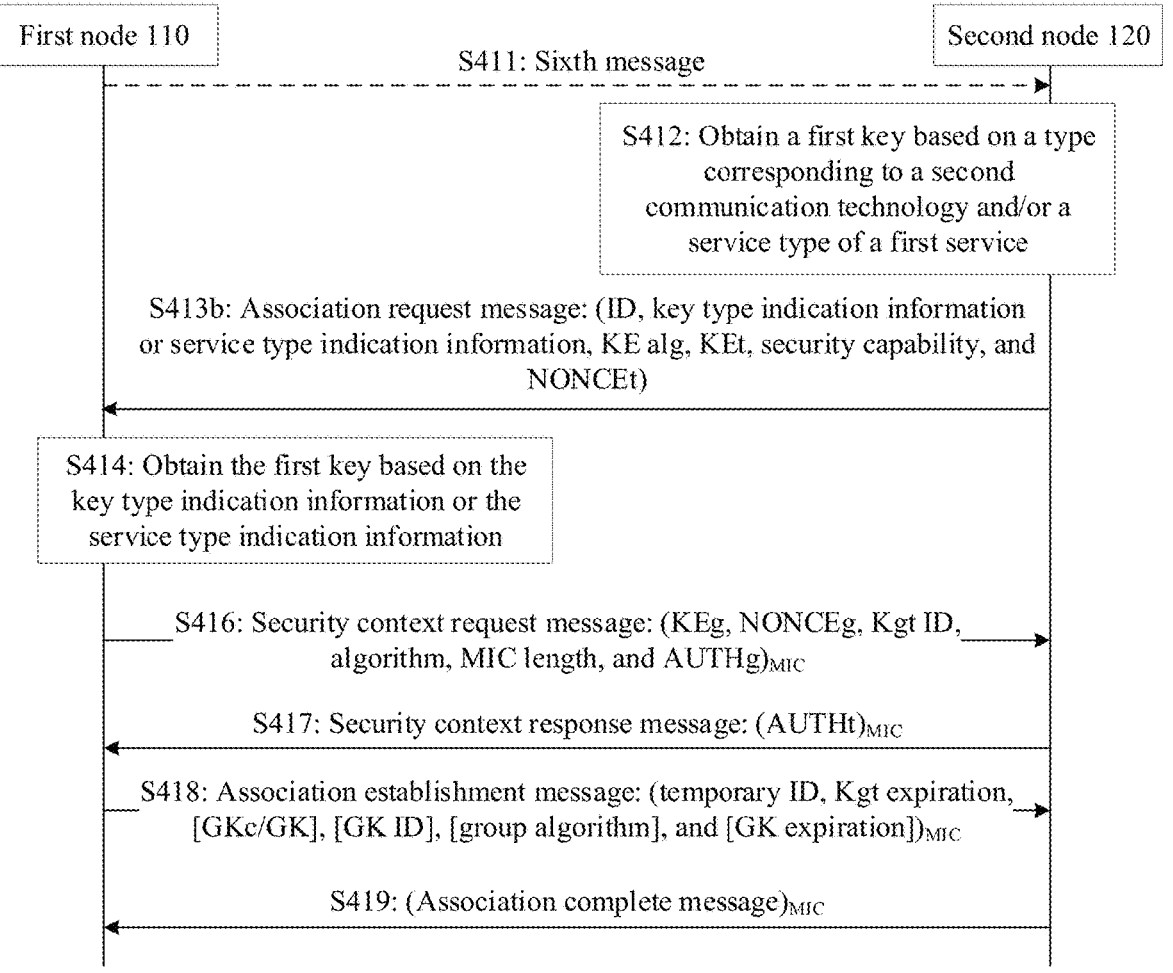
FIG. 4b is a schematic flowchart of a communication method according to an embodiment of this application.

As shown in FIG. 4*b*, in Method example 2, the communication method may include the following operations.

S411 (optional): The first node 110 sends a sixth message (for example, a system message). Correspondingly, the second node 120 may receive the sixth message. For detailed implementation, refer to the related description of S411 described above with reference to FIG. 4*a*. Details are not described herein again.

S412: The second node 120 (for example, a service layer of the second node 120) obtains the first key or a type of the first key based on a type corresponding to the second communication technology and/or a service type of the first service. For detailed implementation, refer to the related description of S412 described above with reference to FIG. 4*a*. Details are not described herein again.

S413*b* (optional): The second node 120 sends an association request message to the first node 110. Correspondingly, the first node 110 may receive the association request message from the second node 120.

Compared with Method example 1 described in FIG. 4*a*, in Method example 2, the association request message sent by the second node 120 carries key type indication information or service type indication information. To be specific, the association request message in Method example 2 is corresponding to a combination of the first message and the association request message in Method example 1. The association request message may carry an ID of the first node 110, the key type indication information or the service type indication information, and the related authentication parameter used for identity authentication of the second node 120, including but not limited to KE alg selected by the second node 120, KEt, a security capability of the second node 120, and NONCEt. The security capability may include one or more of KDF, an encryption algorithm, an integrity protection algorithm, and an authentication encryption algorithm that are supported by the second node 120. For detailed implementation, refer to the related descriptions of S413*a* and S415*a* described above with reference to FIG. 4*a*. Details are not described herein again.

S414: The first node 110 obtains the first key based on the key type indication information or the service type indication information. For detailed implementation, refer to S414 described above with reference to FIG. 4*a*. Details are not described herein again.

S416: The first node 110 sends, to the second node, a security context request message (an example of a second message) associated with the first key. Correspondingly, the second node 120 receives the security context request message from the first node 110. For detailed implementation, refer to the related description of S416 described above with reference to FIG. 4*a*. Details are not described herein again.

S417: The second node 120 sends a security context response message (an example of a third message) to the first node 110. Correspondingly, the first node 110 receives the security context response message from the second node 120. For detailed implementation, refer to the related description of S417 described above with reference to FIG. 4*a*. Details are not described herein again.

S418: The first node 110 may send an association establishment message (an example of a fourth message) to the second node when identity authentication of the second node 120 succeeds. Correspondingly, the second node 120 receives the association establishment message from the first node 110. For detailed implementation, refer to the related description of S418 described above with reference to FIG. 4*a*. Details are not described herein again.

S419: The second node 120 may send an association complete message to the first node 110. Correspondingly, the first node 110 may receive the association complete message from the second node 120. For detailed implementation, refer to the related description of S419 described above with reference to FIG. 4*a*. Details are not described herein again.

Method Example 3

In Method example 3, the first node 110 may obtain a first key, and the first node 110 may perform identity authentication and a security context negotiation procedure with the second node 120 based on the first key, to establish a secure first communication connection between the first node 110 and the second node 120. It should be noted that operations S421 to S427 included in Method example 3 are merely examples of optional operations. In some examples, implementation sequence numbers of the following operations may be alternatively exchanged. This is not specifically limited in embodiments of this application.

Figure 4C:
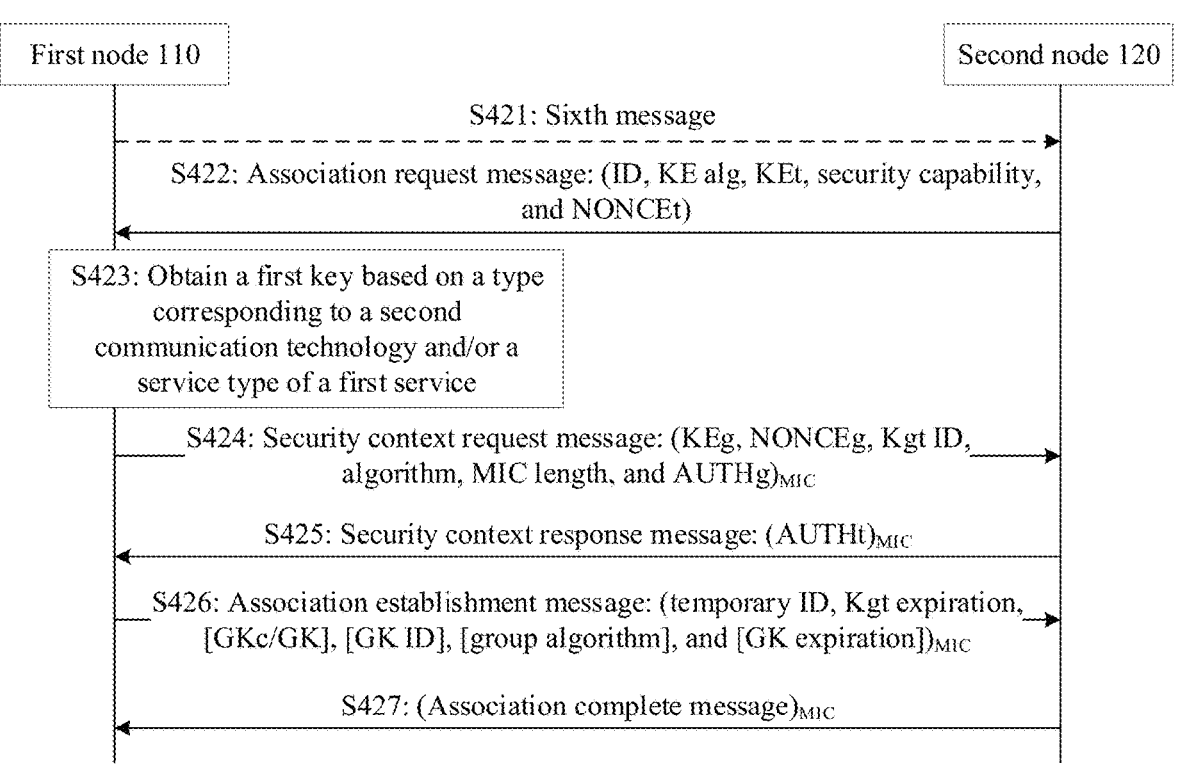
FIG. 4c is a schematic flowchart of a communication method according to an embodiment of this application.

As shown in FIG. 4*c*, the communication method may include, for example, the following operations.

S421 (optional): The first node 110 sends a sixth message (for example, a system message). Correspondingly, the second node 120 may receive the sixth message. For detailed implementation, refer to S411 described above with reference to FIG. 4*a*. Details are not described herein again.

S422 (optional): The second node 120 sends an association request message to the first node 110. Correspondingly, the first node 110 may receive the association request message from the second node 120.

In an embodiment of this application, the association request message may carry an identity ID (for example, a media access layer identifier) of the second node 120 and a related parameter used to indicate a capability of the second node 120, including but not limited to a key agreement algorithm (for example, represented by KE alg) selected by the second node 120, a key agreement parameter (for example, represented by KEt), a security capability (sec capabilities) of the second node 120, and a random number NONCEt. The security capability may include one or more of a key derivation function KDF, an encryption algorithm, an integrity protection algorithm, an authentication encryption algorithm, and the like that are supported by the second node 120. Details are not described herein again.

For example, the association request message may be represented as the following tuple:

(ID, KE alg, KEt, sec capabilities, NONCEt)

S423: The first node 110 obtains the first key based on a type corresponding to the second communication technology and/or a service type of the first service.

It should be understood that, during implementation of S423, the first node 110 may alternatively obtain the first key based on related indication information input by a user, or obtain the first key based on related indication information from another device. This is not limited in embodiments of this application. For detailed implementation of S423, refer to S412 described above with reference to FIG. 4*a*. Details are not described herein again.

S424: The first node 110 sends a security context request message (an example of a second message) to the second node based on the first key. Correspondingly, the second node 120 receives the security context request message from the first node 110. The security context request message is associated with the first key. For detailed implementation details, refer to related descriptions of S416 in FIG. 4*a*. Details are not described herein again.

S425: The second node 120 sends a security context response message (an example of a third message) to the first node 110. Correspondingly, the first node 110 receives the security context response message from the second node 120. For detailed implementation details, refer to related descriptions of S417 in FIG. 4*a*. Details are not described herein again.

S426: The first node 110 sends an association establishment message (an example of a fourth message) to the second node when identity authentication of the second node 120 succeeds. Correspondingly, the second node 120 receives the association establishment message from the first node 110. For detailed implementation details, refer to related descriptions of S418 in FIG. 4*a*. Details are not described herein again.

S427: The second node 120 may send an association complete message to the first node 110. Correspondingly, the first node 110 may receive the association complete message from the second node. For detailed implementation details, refer to related descriptions of S419 in FIG. 4*a*. Details are not described herein again.

Therefore, in the communication methods shown in FIG. 4*a*, FIG. 4*b*, and FIG. 4*c*, in a scenario in which there are a plurality of keys, the first node 110 and the second node 120 may select the first key associated with the first service, and complete identity authentication and the security context negotiation procedure between the two parties based on the first key, to establish a secure first communication connection between the two parties. In this way, during performing of a service between the first node 110 and the second node 120, data corresponding to the service may be transmitted based on secure communication connections established by using different keys, to meet a security requirement in a converged communication scenario and ensure security of the corresponding service data.

Compared with the communication methods shown in FIG. 4a and FIG. 4b, in the communication method shown in FIG. 4c, the first node 110 may proactively select a key for the second node 120 as the first key based on a related capability of the second node 120, for example, a service type, a service feature, and a communication capability that are reported during registration. Therefore, the second node 120 and the first node 110 do not need to exchange a first message (that is, a key indication message) with each other. This can reduce signaling overheads.

Case 2: The first information includes a first security context used for communication between the first node 110 and the second node 120.

In this case, in each of the first node 110 and the second node 120, there are at least two sets of security contexts, for example, the common security context, the trusted security context, and the untrusted security context. The first node 110 and the second node 120 may determine a required first security context from the at least two sets of security contexts through negotiation, and establish a secure first communication connection based on the first security context. It should be noted that operations S431 to S435 included in Case 2 are merely examples of optional operations. In some examples, implementation sequence numbers of the following operations may be alternatively exchanged. This is not specifically limited in embodiments of this application.

Figure 4D:
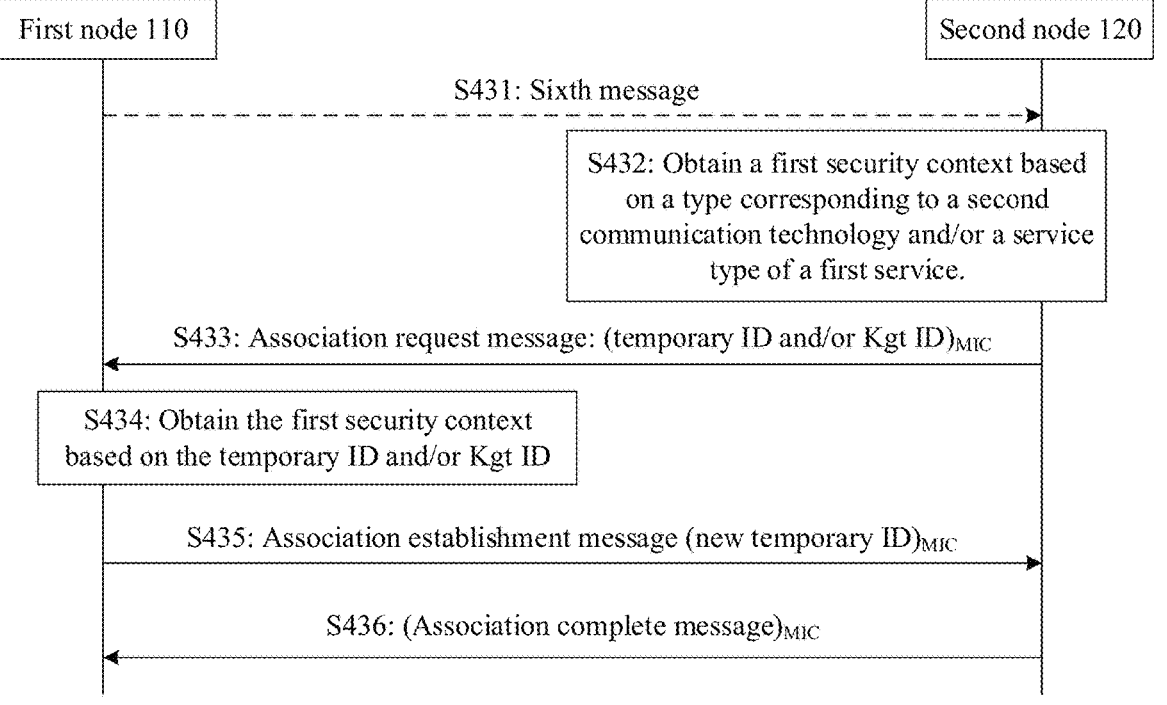
FIG. 4d is a schematic flowchart of a communication method according to an embodiment of this application.

As shown in FIG. 4d, the communication method may include, for example, the following operations.

S431 (optional): The first node 110 sends a sixth message (for example, a system message). Correspondingly, the second node 120 may receive the sixth message. For detailed implementation, refer to S411 described above with reference to FIG. 4a. Details are not described herein again.

S432: The second node 120 obtains the first security context or a type of the first security context based on a type corresponding to the second communication technology and/or a service type of the first service.

It should be understood that, during S432, the second node 120 may alternatively obtain the first security context or the type of the first security context based on related indication information input by a user, or obtain the first security context or the type of the first security context based on related indication information from another device. This is not limited in embodiments of this application. It should be understood that in this embodiment of this application, the second node 120 may alternatively obtain the first security context or the type of the first security context in another manner. This is not limited in embodiments of this application.

In an embodiment of this application, in a converged communication scenario, the first security context may be implemented in any one of the following manners:

Example 3: The First Security Context is a Security Context Used for a Service of the Second Communication Technology The security context used for a service of the second communication technology includes a trusted security context or an untrusted security context, the trusted security context is a security context that is successfully authenticated through the network, and the untrusted security context is a security context that is not authenticated through the network. The network herein may be understood as a network corresponding to the third node. For example, the network may be a 5G core network. It should be understood that in this embodiment of this application, the security context that is not authenticated through the network may be understood as a key that is not confirmed through the network or that does not need to be confirmed through the network (for example, a security context corresponding to a default key), or a key that has undergone confirmation through the network but is not successfully confirmed (for example, a security context corresponding to the foregoing key that is not authenticated through the network).

The foregoing security context corresponding to the PSK is used as an example. If the security context has not been authenticated through the core network (for example, a 5G core network) corresponding to the third node 130 or is not obtained through a key agreement process, or the security context is obtained after agreement but has not been agreed on, the security context is an untrusted security context, and is corresponding to the foregoing untrusted fused PSK. If the security context is authenticated through the core network corresponding to the third node 130 and is obtained after a key agreement process and is agreed on, the security context is a trusted security context, and is corresponding to the foregoing trusted fused PSK.

Example 4: The First Security Context is a Security Context Used for a Service of the First Communication Technology Similar to the priorities and the use principle of the plurality of keys in the foregoing, in an embodiment of this application, the at least two sets of security contexts may also have security context priorities and a use principle. The first security context is associated with the first service, and the first security context needs to be selected from the at least two sets of security contexts according to at least the following principle: When the first service is a service of the first communication technology, the first security context is a security context used for a service of the first communication technology; and/or when the first service is a service of the second communication technology, the first security context is a security context used for a service of the second communication technology.

For example, (1) for a service of the second communication technology in a converged communication scenario, if there is a trusted security context used for the service of the second communication technology in the converged communication scenario, an untrusted security context used for the service of the second communication technology in the converged communication scenario is not used, but the trusted security context is used, in other words, a priority of the trusted security context is higher than that of the untrusted security context; (2) for a service of the second communication technology in a converged communication scenario, a security context used for the service of the second communication technology in the converged communication scenario is used, and a security context used for a service of the first communication technology is not used, in other words, a priority of an untrusted security context used for the service of the second communication technology in the converged communication scenario is higher than that of the security context used for the service of the first communication technology; and (3) for a service of the first communication technology, even if there is a security context used for a service of the second communication technology in a converged communication scenario, a security context used for the service of the first communication technology needs to be used to ensure security of a private service between the first node 110 and the second node 120.

During S432, the second node 120 may obtain, based on the type corresponding to the second communication technology and/or the service type of the first service and based on the foregoing use principle, the first security context, for example, a security context used for a service of the first communication technology, an untrusted security context in a converged communication scenario, or a trusted security context in a converged communication scenario. For example, the type corresponding to the second communication technology may be a type of a communication standard used in the second communication technology, for example, a 5G technology.

S433: The second node 120 sends an association request message (an example of a fifth message) to the first node 110. Correspondingly, the first node 110 receives the association request message.

For example, the association request message may include a temporary ID (for example, a physical layer identifier) of the second node 120 and/or an identifier associated with the first security context. For example, the identifier is represented as Kgt ID.

In an embodiment, the second node 120 may further perform integrity protection on the association request message by using a signaling-plane integrity protection algorithm and a signaling-plane integrity protection key Ks.int. A MIC obtained through calculation may be carried in the association request message.

For example, the association request message may be represented as the following tuple:

(Temporary ID, Kgt ID)$_{MIC}$, where ( )$_{MIC}$ indicates that the association request message is a message on which integrity protection processing has been performed.

S434: The first node 110 obtains the first security context based on the temporary ID and/or Kgt ID.

In an embodiment, the first node 110 may check integrity of the association request message based on the first security context.

If the first node 110 does not have the temporary ID of the second node 120, or does not have the corresponding first security context, or the first node 110 fails to check the MIC, the first node 110 may send, to the second node 120, a failure message carrying a cause value (not shown in the figure). After receiving the failure message, the second node 120 may initiate an identity authentication procedure and a security context negotiation procedure in a case in which there is no security context. For example, for details thereof, refer to the method operations in FIG. 4a or FIG. 4b. Details are not described herein again.

If the first node 110 successfully checks integrity of the association request message, the first node 110 may generate a new temporary ID (T-ID) for the second node 120.

S435: The first node 110 sends an association establishment message (that is, a seventh message) to the second node 120. Correspondingly, the second node 120 may receive the seventh message from the first node.

In an embodiment, the association establishment message may include the new temporary ID (T-ID) generated by the first node 110 for the second node 120.

In an embodiment, the first node 110 may further perform integrity protection on the association establishment message by using a signaling-plane integrity protection algorithm and a signaling-plane integrity protection key Ks.int. When signaling-plane encryption protection is started, the first node 110 may perform encryption protection on the association establishment message by using a signaling-plane encryption algorithm and a signaling-plane encryption key Ks.enc.

For example, the association establishment message may be represented as the following tuple:

(New temporary ID)$_{MIC}$, where ( )$_{MIC}$ indicates that the association establishment message is a message on which integrity protection processing has been performed.

If the first node 110 encrypts the association establishment message, the second node 120 may decrypt the association establishment message. The second node 120 may further check integrity of the association establishment message. If integrity verification fails, the message is discarded. If integrity verification succeeds, the following S436 is performed: The second node 120 may send an association complete message (that is, an eighth message) to the first node 110.

The second node 120 may perform integrity protection on the association complete message by using a signaling-plane integrity protection algorithm and a signaling-plane integrity protection key Ks.int. When signaling-plane encryption protection is started, the second node 120 may perform encryption protection on the association complete message by using a signaling-plane encryption algorithm and a signaling-plane encryption key Ks.enc.

For example, the association complete message may be represented as follows:

(Association complete message)$_{MIC}$, where ( )$_{MIC}$ indicates that the association complete message is a message on which integrity protection processing has been performed.

Therefore, in the communication method shown in FIG. 4d, in a scenario in which there are a plurality of sets of security contexts, the first node 110 and the second node 120 may select the first security context associated with the first service, and establish the first communication connection between the two parties based on the first security context. In this way, during performing of a service between the first node 110 and the second node 120, data corresponding to the service may be transmitted based on first communication connections established by using different security contexts, to meet a security requirement in a converged communication scenario and ensure security of the corresponding service data.

It should be noted that in this embodiment of this application, if the second node 120 cannot establish, for a plurality of times, an association with the first node 110 by using a stored security context, the second node 120 may attempt to delete the stored security context, and initiate, between the second node 120 and the first node 110 by using the method shown in FIG. 4a or FIG. 4b, an association procedure in which there is no security context. Details are not described herein again.

An embodiment of this application further provides a communication apparatus, configured to perform the method performed by the first node in the foregoing method embodiments. For related features, refer to the foregoing method embodiments. Details are not described herein again.

Figure 5:
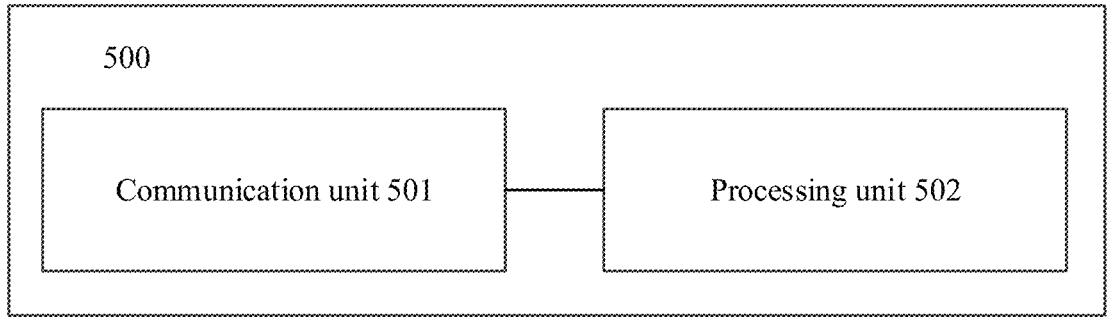
FIG. 5 is a schematic diagram of a communication apparatus according to an embodiment of this application.

As shown in FIG. 5, the apparatus 500 may include: a communication unit 501, configured to communicate with a second node; and a processing unit 502, configured to obtain first information; and establish a first communication connection to the second node based on the first information, where the first communication connection is used to transmit data of a first service, and the first communication connection is corresponding to a first communication technology;

and the first node is a node that accesses a network corresponding to a second communication technology. For example, the first service may be a service of the first communication technology or a service of the second communication technology. For a specific implementation, refer to the related descriptions in the embodiments shown in FIG. 1 to FIG. 4*d*. Details are not described herein again.

In an embodiment, the communication apparatus 500 shown in FIG. 5 may be further configured to perform the method performed by the second node in the foregoing method embodiments. For example, the communication unit 501 is configured to communicate with the first node; and the processing unit 502 is configured to obtain first information; and establish a first communication connection to the first node based on the first information, where the first communication connection is used to transmit data of a first service, and the first communication connection is corresponding to a first communication technology; and the first node is a node that accesses a network corresponding to a second communication technology. For example, the first service may be a service of the first communication technology or a service of the second communication technology. For related features, refer to the foregoing method embodiments. Details are not described herein again.

It should be noted that, in embodiments of this application, module division is an example, and is merely logical function division. During actual implementation, another division manner may be used. Functional units in embodiments of this application may be integrated into one processing unit, or each of the units may exist alone physically, or two or more units may be integrated into one unit. The integrated unit may be implemented in a form of hardware, or may be implemented in a form of a software function unit.

If the integrated unit is implemented in the form of the software function unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) or a processor to perform all or some of the operations in the methods in embodiments of this application. The foregoing storage medium includes any medium that can store program code, such as a USB flash drive, a removable hard disk, a read-only memory (ROM), a random access memory (RAM), a magnetic disk, or an optical disc.

In a possible implementation, an embodiment of this application provides a computer-readable storage medium. The computer-readable storage medium stores program code. When the program code is run on a computer, the computer is enabled to perform the method in the foregoing method embodiments.

In a possible implementation, an embodiment of this application provides a computer program product. When the computer program product runs on a computer, the computer is enabled to perform the method in the foregoing method embodiments.

Figure 6:
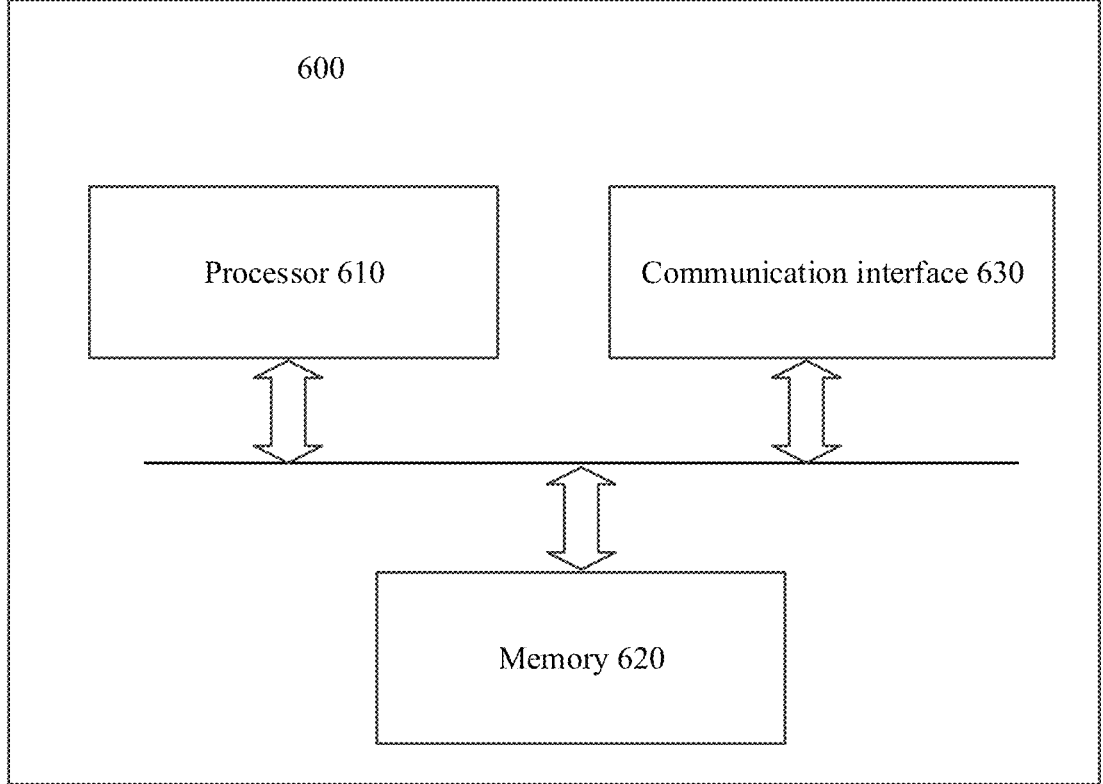
FIG. 6 is a schematic diagram of a communication apparatus according to an embodiment of this application.

In a simple embodiment, a person skilled in the art may figure out that all the communication apparatuses in the foregoing embodiments may be in a form shown in FIG. 6.

An apparatus 600 shown in FIG. 6 includes at least one processor 610 and a communication interface 630. In an optional design, the apparatus may further include a memory 620.

A specific connection medium between the processor 610 and the memory 620 is not limited in embodiments of this application.

In the apparatus shown in FIG. 6, when communicating with another device, the processor 610 may perform data transmission through the communication interface 630.

When the communication apparatus is in the form shown in FIG. 6, the processor 610 in FIG. 6 may invoke computer-executable instructions stored in the memory 620, so that the apparatus 600 can perform the method performed by the communication apparatus in any one of the foregoing method embodiments.

An embodiment of this application further relates to a chip system. The chip system includes a processor, configured to invoke a computer program or computer instructions stored in a memory, so that the processor performs the method in any one of the foregoing embodiments.

In a possible implementation, the processor may be coupled to the memory by using an interface.

In a possible implementation, the chip system may further directly include a memory, and the memory stores a computer program or computer instructions.

For example, the memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, RAMs in many forms, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM), may be used.

An embodiment of this application further relates to a processor. The processor is configured to invoke a computer program or computer instructions stored in a memory, so that the processor performs the method in any one of the foregoing embodiments.

For example, in this embodiment of this application, the processor is an integrated circuit chip, and has a signal processing capability. For example, the processor may be a field programmable gate array (FPGA), may be a general purpose processor, a digital signal processor (DSP), an application-specific integrated circuit (ASIC), or another programmable logic device, a discrete gate or transistor logic device, or a discrete hardware component, or may be a system on chip (SoC), a central processing unit (CPU), a network processor (NP), a micro controller unit (MCU), or a programmable controller (PLD), or another integrated chip; and the processor may implement or perform the methods, operations, and logical block diagrams disclosed in embodiments of this application. The general-purpose processor may be a microprocessor, or the processor may be any conventional processor or the like. The operations in the method disclosed with reference to embodiments of this application may be directly executed and completed by using a hardware decoding processor, or may be executed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It should be understood that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and operations are performed on the computer or the another programmable device, so that computer-implemented processing is generated. Therefore, the instructions executed on the computer or the another programmable device provide operations for implementing a specific function in one or more procedures in the flowcharts and/or in one or more blocks in the block diagrams.

Obviously, a person skilled in the art can make various modifications and variations to embodiments of this application without departing from the scope of the embodiments of this application. Thus, if these modifications and variations in embodiments of this application fall within the scope of the claims of this application and equivalent technologies thereof, this application is also intended to include these modifications and variations.

What is claimed is:

1. A communication apparatus operating as part of a first node, comprising:

at least one processor; and one or more memories coupled to the at least one processor and storing instructions, which when executed by the at least one processor, cause the at least one processor to perform operations, the operations comprising:

obtaining first information; and establishing a first communication connection to a second node based on the first information, wherein the first communication connection is used to transmit data of a first service, and the first communication connection is corresponding to a first communication technology, wherein the first node is a node that accesses a network corresponding to a second communication technology, and the first service is a service of the first communication technology or a service of the second communication technology.

2. The communication apparatus according to claim 1, wherein the first information comprises a first key used for communication authentication with the second node, and the obtaining first information comprises:

obtaining the first key based on a type corresponding to the second communication technology and/or a service type of the first service.

3. The communication apparatus according to claim 1, wherein the first information comprises a first key used for communication authentication with the second node, and the operations further comprise:

receiving a first message from the second node, wherein the first message carries key type indication information or service type indication information; and obtaining the first key based on the key type indication information or the service type indication information.

4. The communication apparatus according to claim 2, wherein the establishing a first communication connection to a second node based on the first information comprises:

sending a second message associated with the first key to the second node, wherein the second message is used for identity authentication of the first node;

receiving a third message that is in response to the second message, wherein the third message is used for identity authentication of the second node; and sending a fourth message to the second node when identity authentication of the second node succeeds, wherein the fourth message is used to establish the first communication connection to the second node.

5. The communication apparatus according to claim 2, wherein when the first service is a service of the first communication technology, the first key is used for a service of the first communication technology; or when the first service is a service of the second communication technology, the first key is used for a service of the second communication technology.

6. The communication apparatus according to claim 5, wherein a key used for a service of the second communication technology comprises a trusted key that is successfully authenticated through the network or an untrusted key that is not authenticated through the network, wherein a priority of the trusted key is higher than that of the untrusted key.

7. The communication apparatus according to claim 1, wherein before establishing the first communication connection, the operations further comprise:

receiving a key from the network to be used for a service of the second communication technology.

8. The communication apparatus according to claim 1, wherein the first information comprises a first security context used for communication with the second node, and the obtaining first information comprises:

receiving a fifth message from the second node, wherein the fifth message carries an identifier associated with the first security context; and obtaining the first security context based on the identifier.

9. The communication apparatus according to claim 8, wherein when the first service is a service of the first communication technology, the first security context is used for a service of the first communication technology; or when the first service is a service of the second communication technology, the first security context is used for a service of the second communication technology.

10. The communication apparatus according to claim 9, wherein a security context used for a service of the second communication technology comprises a trusted security context that is successfully authenticated through the network or an untrusted security context that is not authenticated through the network, wherein a priority of the trusted security context is higher than that of the untrusted security context.

11. The communication apparatus according to claim 1, wherein before obtaining the first information, the operations further comprise:

sending a sixth message to the second node, wherein the sixth message carries information used to indicate that the first node supports the second communication technology.

12. A communication apparatus operating as part of a second node, comprising:

at least one processor; and one or more memories coupled to the at least one processor and storing instructions, which when executed by the at least one processor, cause the at least one processor to perform operations, the operations comprising:

obtaining first information; and establishing a first communication connection to a first node based on the first information, wherein the first communication connection is used to transmit data of a first service, and the first communication connection is corresponding to a first communication technology, wherein the first node is a node that accesses a network corresponding to a second communication technology, and the first service is a service of the first communication technology or a service of the second communication technology.

13. The communication apparatus according to claim 12, wherein the first information comprises a first key used for communication authentication with the first node, and the obtaining first information comprises:

obtaining the first key based on a type corresponding to the second communication technology and/or a service type of the first service.

14. The communication apparatus according to claim 13, wherein the operations further comprise:

sending a first message to the first node, wherein the first message carries information associated with the first key.

15. The communication apparatus according to claim 13, wherein the establishing a first communication connection to the first node based on the first information comprises:

receiving a second message from the first node, wherein the second message is associated with the first key, and the second message is used for identity authentication of the first node;

when identity authentication of the first node succeeds, sending a third message to the first node, wherein the third message is used for identity authentication of the second node; and receiving a fourth message that is in response to the third message, wherein the fourth message is used to establish the first communication connection to the second node.

16. The communication apparatus according to claim 13, wherein when the first service is a service of the first communication technology, the first key is used for a service of the first communication technology; or when the first service is a service of the second communication technology, the first key is used for a service of the second communication technology.

17. The communication apparatus according to claim 16, wherein a key used for a service of the second communication technology comprises a trusted key that is successfully authenticated through the network or an untrusted key that is not authenticated through the network, wherein a priority of the trusted key is higher than that of the untrusted key.

18. The communication apparatus according to claim 12, wherein before establishing the first communication connection, the operations further comprise:

receiving a key from the network to be used for a service of the second communication technology.

19. The communication apparatus according to claim 12, wherein the first information comprises a first security context, the first security context is used by the second node to establish the first communication connection to the first node, and the obtaining first information comprises:

obtaining the first security context based on a type corresponding to the second communication technology and/or a service type of the first service.

20. A method performed at a first node, comprising:

obtaining first information; and establishing a first communication connection to a second node based on the first information, wherein the first communication connection is used to transmit data of a first service, and the first communication connection is corresponding to a first communication technology, wherein the first node is a node that accesses a network corresponding to a second communication technology, and the first service is a service of the first communication technology or a service of the second communication technology.

* * * * *